United States Patent [19]

Back et al.

[11] Patent Number: 4,678,851
[45] Date of Patent: Jul. 7, 1987

[54] METAL DYE COMPLEXES CONTAINING AN AZO OR AZOMETHINE DYE AND A COLORLESS LIGAND WITH THE C=N—N=C GROUP

[75] Inventors: Gerhard Back, Lörrach, Fed. Rep. of Germany; Hans U. Schütz, Basel, Switzerland; Ulrich Schlesinger, Binzen, Fed. Rep. of Germany

[73] Assignee: Ciba-Geigy Corporation, Ardsley, N.Y.

[21] Appl. No.: 717,743

[22] Filed: Mar. 28, 1985

[30] Foreign Application Priority Data

Apr. 6, 1984 [CH] Switzerland .................. 1750/84

[51] Int. Cl.$^4$ ............... C09B 62/012; C09B 62/032; C09B 62/095; C09B 62/477
[52] U.S. Cl. ............ 534/619; 534/622; 534/627; 534/629; 534/638; 534/642; 534/695; 534/699; 534/738
[58] Field of Search ............ 534/695, 699, 738, 619, 534/629, 638, 642, 622, 627

[56] References Cited

U.S. PATENT DOCUMENTS

| | | | |
|---|---|---|---|
| 4,256,633 | 3/1981 | Beffa | 534/695 X |
| 4,544,739 | 10/1985 | Schutz et al. | 534/695 X |
| 4,563,193 | 1/1986 | Beffa | 534/695 X |

FOREIGN PATENT DOCUMENTS

| | | | |
|---|---|---|---|
| 0068242 | 1/1983 | European Pat. Off. | 534/695 |
| 0088729 | 9/1983 | European Pat. Off. | 534/695 |
| 91817 | 3/1896 | Fed. Rep. of Germany | 534/738 |
| 730058 | 5/1955 | United Kingdom | 534/695 |
| 1016964 | 1/1966 | United Kingdom | 534/738 |
| 1512679 | 6/1978 | United Kingdom | 534/695 |

OTHER PUBLICATIONS

Bulletin of the Chemical Society of Japan, vol. 41, pp. 2807-2810, (Tamaka).

*Primary Examiner*—Floyd D. Higel
*Attorney, Agent, or Firm*—Edward McC. Roberts; Meredith C. Findlay

[57] ABSTRACT

Metal complex dyes that produce level, fast dyeings on textile materials are provided according to the formula $$\left[\begin{array}{c} R_1-CR_2=N-N=C-V-R_3 \\ | \\ (C=O)_w \\ | \\ O \diagdown \diagup Q \\ Me \\ \diagup \diagdown \\ \left[\begin{array}{c} Z_1 \quad Z_2 \\ | \quad | \\ D-N=Y-K \end{array}\right]_n \end{array}\right] K_a \quad (X)_p$$

wherein:
D is a benzene, naphthalene or heterocyclic radical of a diazo component;
Y is nitrogen or —CH;
K is the radical of a coupling component if Y is nitrogen, or an o-hydroxyaldehyde radical if Y is —CH:
Ka is a cation;
Me is chromium or cobalt;
$Z_1$ is —O— or —COO— ortho to N=Y
$Z_2$ is —O— or —NR vicinal to N=Y, wherein R is hydrogen or substituted or unsubstituted $C_1$-$C_4$ alkyl or phenyl;
X is a fiber reactive radical bound directly to or through an amino or amino-containing group to the complex;
$R_1$ is a direct bond or substituted or unsubstituted $C_1$-$C_8$-alkyl, $C_1$-$C_8$-alkenyl, or aryl radical or heterocyclic radical containing 1 to 3 sulfur, oxygen or nitrogen atoms;
$R_2$ is hydrogen or substituted or unsubstituted $C_1$-$C_8$-alkyl or aryl;
$R_3$ is hydrogen or substituted or unsubstituted $C_1$-$C_8$ alkyl, aryl or amino radical, or a heterocyclic radical containing 1 to 3 sulfur, oxygen or nitrogen atoms;
V is a direct bond or oxygen;
Q is oxygen or sulfur;
w is 0 or 1;
n is 0, 1, 2, 3 or 4, and
p is 0, 1, 2
with the proviso that the sum of n+p is at least 1.

19 Claims, No Drawings

METAL DYE COMPLEXES CONTAINING AN AZO OR AZOMETHINE DYE AND A COLORLESS LIGAND WITH THE C=N—N=C GROUP

Metal complex dyes have long been known in the art and are widely used for dyeing and printing textiles made from fibre materials in a very wide range of shades. In view of the increasingly more stringent demands made of these dyes, for example with respect to levelness of dyeings and fastness properties, the dyes of the prior art are often not entirely satisfactory. Thus many of the known 1:2 metal complex azo or azomethine dyes do not satisfy current requirements regarding levelness because of poor diffusibility of the dyes in the fibre. Most of the known 1:1 metal complex azo or azomethine dyes suffer from the drawback that they have to be dyed at a very acid pH value at which some fabrics may be damaged. Metal complex dyes containing a chromophoric ligand and a colourless to substantially non-chromophoric ligand, which dyes have better diffusibility in the fibre than 1:2 metal complex azo or azomethine dyes, are already known in the art. However, many of these dyes do not meet the requirements in respect of stability of the complexes.

It is the object of the present invention to provide novel metal complex azo or azomethine dyes that give level dyeings of good allround fastness properties, especially wetfastness properties, and are readily obtained and simple to apply, and which, in particular, have the excellent stability of 1:2 metal complex azo or azomethine dyes. It has been found that the novel chromium or cobalt complex dyes defined below meet these requirements.

Accordingly, the present invention relates to chromium or cobalt complex dyes of the formula

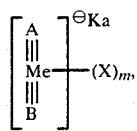 (1)

wherein A is the radical of a bicyclic metallisable azo or azomethine dye, B is the radical of a tridentate, dianionic complexing organic compound that contains a

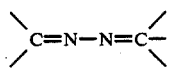

group which participates in the chromium or cobalt complex, X is a fibre-reactive radical, Me is a chromium or cobalt atom, Ka is a cation and m is 1, 2, 3 or 4.

The chromium or cobalt complexes of the formula (1) are anionic. The radical B therefore participates in the chromium or cobalt complex as radical of a tridentate, complexable organic compound having two covalent bonds and one co-ordinative bond.

The definition of B as radical of a dianionic compound means that the compound affording the radical B contains two metallisable groups which, for example by removal of a hydrogen atom as in —OH, —COOH or —SH— groups, are able to react with the metal atom to form covalent bonds.

Aside from the complexing groups, the radical A in formula (1) of an azo or azomethine dye can carry the customary substituents of dyes, for example $C_1$–$C_4$alkyl groups such as methyl, ethyl, propyl, isopropyl and butyl, $C_1$–$C_4$alkoxy groups such as methoxy, ethoxy, propoxy, isopropoxy and butoxy, $C_1$–$C_6$acylamino groups such as acetylamino and propionylamino, benzoylamino, amino, $C_1$–$C_4$monoalkylamino or $C_1$–$C_4$-dialkylamino, phenylamino, $C_1$–$C_4$ alkoxycarbonyl, nitro, cyano, trifluoromethyl, halogen such as fluorine, chlorine and bromine, sulfamoyl, carbamoyl, ureido, hydroxy, $C_1$–$C_4$alkylsulfonyl, for example methylsulfonyl, carboxy, sulfomethyl and sulfo, as well as one to four fibre-reactive radicals X and arylazo groups such as phenylazo and naphthylazo.

The radical A of an azo or azomethine dye is in particular the radical of the formula

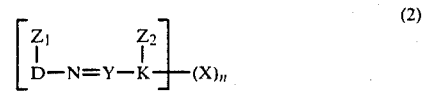 (2)

wherein D is the radical of a diazo component of the benzene, naphthalene or heterocyclic series, Y is a nitrogen atom or the —CH— group, K, if Y is a nitrogen atom, is the radical of a coupling component, preferably of the benzene, naphthalene or heterocyclic series, or of a ketomethylene compound or, if Y is the —CH— group, is the radical of an o-hydroxyaldehyde, $Z_1$ in the ortho-position to the azo or azomethine group is the —O— or —COO— group, and $Z_2$ is the —O— or —N(R) group, where R is hydrogen, unsubstituted or substituted $C_1$–$C_4$alkyl or unsubstituted or substituted phenyl, and $Z_2$ vicinal to the —N=Y— radical is bonded to K, X is as defined in formula (1) and n is 0, 1, 2, 3 or 4, with the proviso that, if n is 0, the radical B in formula (1) contains at least one fibre-reactive radical X.

Of the host of possible tridentate, dianionic, complexable organic compounds that contain the radical B, those colourless to substantially colourless acylhydrazones, semicarbazones and thiosemicarbazones are particularly suitable which are able to form two 5-, 6- or 7-membered rings with the chromium or cobalt atom, preferably two 5- or 6-membered rings and, most preferably, one 5-membered and one 6-membered ring. Surprisingly, the chromium or cobalt complexes of formula (1), wherein B forms a 5-membered and a 6-membered ring with the chromium or cobalt atom, have very great stability.

Particularly preferred compounds are those wherein B is the radical of the formula

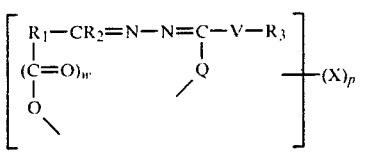

wherein $R_1$ is a direct bond or an unsubstituted or substituted alkyl, alkenyl or aryl radical or is a heterocyclic radical, $R_2$ is hydrogen or an unsubstituted or substituted alkyl or aryl radical, V is a direct bond or an oxygen atom, $R_3$ is hydrogen, unsubstituted or substituted alkyl or aryl radical, a heterocyclic radical or an unsubstituted or substituted amino group, Q is an oxygen or sulfur atom, and w is 0 or 1, X is as defined in formula (1) and p is 0, 1 or 2, with the proviso that, if p is 0, the radical A in formula (1) contains at least one fibre-reactive radical X.

If $R_1$ is a direct bond, then w is preferably 1.

$R_1$ as an unsubstituted or substituted alkyl radical is preferably a $C_1$-$C_8$ alkyl radical, preferably a $C_1$-$C_4$alkyl radical, which may be substituted by halogen such as fluorine, chlorine or bromine, $C_1$-$C_4$alkoxy such as methoxy or ethoxy, aryl such as phenyl or naphthyl, carboxyl, $C_1$-$C_8$alkoxycarbonyl such as methoxycarbonyl or ethoxycarbonyl, phenoxycarbonyl, $C_1$-$C_8$alkylaminocarbonyl such as methylaminocarbonyl or ethylaminocarbonyl and phenylaminocarbonyl.

$R_1$ is an unsubstituted or substituted alkenyl radical is in particular a $C_1$-$C_8$alkenyl radical, preferably a $C_1$-$C_4$alkenyl radical, which may be substituted as indicated above for the alkyl radical $R_1$.

$R_1$ as an unsubstituted or substituted aryl radical is in particular a phenyl or naphthyl radical which may be substituted by $C_1$-$C_4$alkyl such as methyl, ethyl, propyl, isopropyl, butyl, isobutyl, sec-butyl and tert-butyl, $C_1$-$C_4$alkoxy such as methoxy, ethoxy, propoxy, isopropoxy, butoxy, isobutoxy, sec-butoxy and tert-butoxy, halogen such as fluorine, chlorine, and bromine, $C_2$-$C_5$alkanoylamino such as acetylamino, propionylamino and butyrylamino, nitro, hydroxy, cyano, sulfo, the —NH—X group, arylazo groups such as phenylazo or naphthylazo groups which may be further substituted in the phenyl or naphthyl ring by the indicated substituents, as well as by fibre-reactive radicals X.

If $R_1$ is an alkyl, alkenyl or aryl radical, then the —(C=O)$_w$—O— radical is linked to the —C($R_2$) radical preferably through an α- or β-oriented carbon atom.

$R_2$ as an unsubstituted or substituted alkyl radical is preferably a $C_1$-$C_8$alkyl radical, most preferably a $C_1$-$C_4$alkyl radical, which may be further substituted as indicated above for the alkyl radical $R_1$.

$R_2$ as an unsubstituted or substituted aryl radical is preferably a phenyl or naphthyl radical which can be further substituted as indicated above for the aryl radical $R_1$.

$R_3$ as an unsubstituted or substituted alkyl or aryl radical may be an alkyl or aryl radical of the same type as indicated above for $R_1$.

$R_1$ and $R_3$ as a heterocyclic radical are each independently an aliphatic or aromatic heterocyclic radical which contains 1 to 3 hetero atoms such as sulfur, oxygen or nitrogen. Examples of such radicals are: piperidinyl, pyrrolidinyl, morpholinyl, pyrimidinyl, pyridyl, quinolinyl and isoquinolinyl, all of which radicals may be further substituted as indicated for example for the aryl radical $R_1$.

$R_3$ as an unsubstituted or substituted amino group may be —NH$_2$, —N(H)—$C_1$-$C_8$alkyl, —N($C_1$-$C_8$alkyl)$_2$, phenylamino or N—$C_1$-$C_8$alkyl-N-phenylamino, where the phenyl moiety may be substituted as indicated for the phenyl radical $R_1$.

Particularly preferred are the radicals B of the formula (3) wherein at least one of $R_1$ and $R_3$ is an aryl radical.

Also preferred are the radicals B of the formula (3), wherein V is a direct bond and/or Q is an oxygen atom.

The most preferred radicals B are the radicals of the formula (3), wherein $R_1$ is phenyl or naphthyl, each unsubstituted or substituted by $C_1$-$C_4$alkyl, halogen, nitro, acetylamino, sulfo, —NH—X, phenylazo or sulfophenylazo, or is quinolinyl which is substituted by hydroxy, $R_2$ is hydrogen or $C_1$-$C_4$alkyl, V is a direct bond or an oxygen atom, w is 0, Q is an oxygen or sulfur atom, and $R_3$ is hydrogen, amino, $C_1$-$C_4$alkyl or phenyl which is unsubstituted or substituted by $C_1$-$C_4$alkyl, halogen or nitro, or wherein $R_1$ is a direct bond, $R_2$ is hydrogen, $C_1$-$C_4$alkyl, carboxy-substituted $C_1$-$C_4$alkyl, or is phenyl, V is a direct bond or an oxygen atom, w is 1, Q is an oxygen atom and $R_3$ is hydrogen, amino, $C_1$-$C_4$alkyl, or phenyl which is unsubstituted or substituted by $C_1$-$C_4$alkyl, halogen or nitro, or wherein $R_1$ is $C_1$-$C_4$alkyl, $R_2$ is hydrogen, $C_1$-$C_4$alkyl or carboxy-substituted $C_1$-$C_4$alkyl, V is a direct bond or an oxygen atom, w is 0 or 1, Q is an oxygen atom, and $R_3$ is hydrogen, amino, $C_1$-$C_4$alkyl or phenyl which is unsubstituted or substituted by $C_1$-$C_4$alkyl, halogen or nitro, or wherein $R_1$ is $C_3$-$C_6$alkenyl, $R_2$ and $R_3$ are each independently hydrogen, $C_1$-$C_4$alkyl, or phenyl which is unsubstituted or substituted by $C_1$-$C_4$alkyl, halogen or nitro, or $R_3$ is amino, V is a direct bond or an oxygen atom, w is 0, and Q is an oxygen atom.

Examples of preferred radicals of formula (3) are:

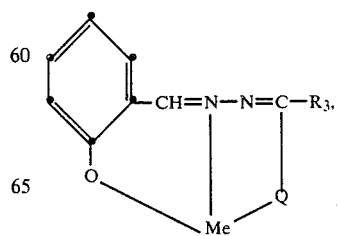

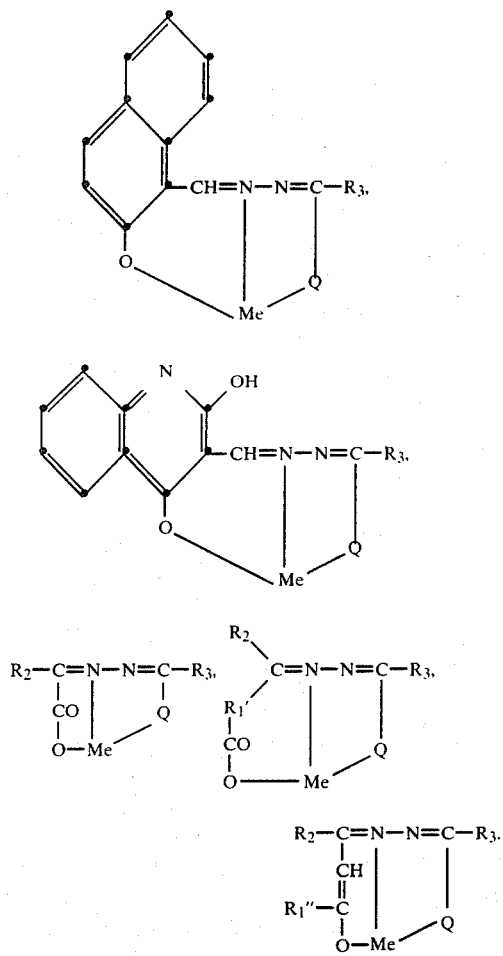

The metal atom has been inserted into the above formulae in order to illustrate the mode of attachment of the radical B to the metal atom. $R_2$, $R_3$, Q and Me are as defined above and $R_1'$ is a $C_1$–$C_4$alkyl radical which, in accordance with the preferred formation of a 5-membered ring and a 6-membered ring by the radical B with the metal atom, is —$CH_2$—,

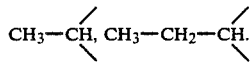

$R_1''$ is $C_1$–$C_4$alkyl.

The fibre-reactive radical X is formula (1) will be understood as meaning those acyl radicals which contain in the molecule one or more reactive groups or removable substituents that are able to react, for example, with cellulosic materials, in the presence of acid acceptors and with or without the action of heat, with the hydroxyl groups of cellulose or with synthetic or natural polyamide fibres, for example wool, namely with the $NH_2$ groups of said fibres, to form covalent bonds. A host of such fibre-reactive groups are known from the literature.

X preferably is a fibre-reactive radical of the aliphatic or heterocyclic series which is attached to the azo or azomethine dye radical A and/or to the radical B either direct or through a bridge member.

X is preferably attached to the radical A and/or B via an amino group which can be monoalkylated, for example —NH—, —N(CH$_3$)—, —N(C$_2$H$_5$)— or —N(C$_3$H$_7$)—, or through a bridge member containing an amino group.

Specific examples of monohalogenated or dihalogenated symmetrical triazinyl radicals are 2,4-dichlorotriazin-6-yl, 2-amino-4-chlorotriazin-6-yl, 2-alkylamino-4-chlorotriazin-6-yl, such as 2-methylamino-4-chlorotriazin-6-yl, 2-ethylamino- or 2-propylamino-4-chlorotriazin-6-yl, 2-β-oxyethylamino-4-chlorotriazin-6-yl, 2-di-β-oxyethylamino-4-chlorotriazin-6-yl and the corresponding sulfuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino-4-chlorotriazin-6-yl, such as 2-phenylamino-4-chlorotriazin-6-yl, 2-(o-, m- or p-carboxy- or -sulfophenyl)-amino-4-chlorotriazin-6-yl, 2-alkoxy-4-chlorotriazin-6-yl, such as 2-methoxy- or 2-ethoxy-4-chlorotriazin-6-yl, 2-cyclohexyloxy-4-chlorotriazin-6-yl, 2-(phenylsulfonyl)-methoxy-4-chlorotriazin-6-yl, 2-aryloxy- and substituted 2-aryloxy-4-chlorotriazin-6-yl, such as 2-phenoxy-4-chlorotriazin-6-yl 2-(p-sulfophenyl)-oxy-4-chlorotriazin-6-yl, 2-(o-, m- or p-methyl- or -methoxyphenyl)-oxy-4-chlorotriazin-6-yl, 2-alkylmercapto- or 2-arylmercapto-4-chlorotriazin-6-yl, such as 2-β-hydroxyethylmercapto-4-chlorotriazin-6-yl, 2-phenylmercapto-4-chlorotriazin-6-yl, 2-(4'-methylphenyl)-mercapto-4-chlorotriazin-6-yl, 2-(2',4'-dinitro)-phenylmercapto-4-chlorotriazin-6-yl, 2-methyl-4-chlorotriazin-6-yl, 2-phenyl-4-chlorotriazin-6-yl and the 2-methoxy-4-fluorotriazin-6-yl radical.

Of particular interest as fibre-reactive radicals are fluoro-1,3,5-triazine radicals of the formula

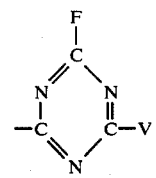

where particular examples of the substituent V on the triazine ring are: radicals of primary, secondary and tertiary amines, such as —NH$_2$, —NHC$_2$H$_5$, —N(C$_2$H$_5$)$_2$, —NH—CH(CH$_3$)$_2$, —NHC$_2$H$_4$OH, —N(C$_2$H$_4$OH)$_2$, morpholino, piperidino, N-phenylamino, N-(2-, 3- or 4-sulfophenyl)-amino, N-toluidino, N-(2,4- or 2,5-disulfophenyl)-amino and N-(γ-methoxypropyl)amino, and $C_{1-4}$-alkoxy radicals, such as methoxy, ethoxy, isopropoxy, propoxy or phenoxy.

Also of interest are reactive radicals which have the following formula

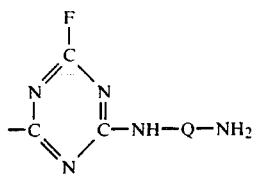

in which Q is an aliphatic or aromatic bridge member. Radicals of this type can be further substituted with 2,4,6-trifluoro-1,3,5-triazine to form a radical of the formula

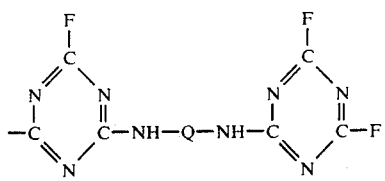

and this radical can finally be reacted with an amine. Examples of suitable amines of this type are ammonia, methylamine, ethylamine, dimethylamine, diethylamine, ethanolamine, diethanolamine, morpholino, piperidine, 2-, 3- or 4-aminotoluene, metanilic acid, sulfanilic acid, aniline, N-methylaniline, 4-aminobenzylsulfonic acid, 2-, 3- or 4-aminobenzoic acid, naphthylaminomonosulfonic, naphthylaminodisulfonic and naphthylaminotrisulfonic acids and also amino-containing dyes.

Examples of suitable diamines which introduce the radical of the formula —HN—Q—NH$_2$ are: ethylenediamine, 1,3-diaminopropane, 1,6-diaminohexane, 1,3- and 1,4-phenylenediamine, 1,3-phenylenediamine-4-sulfonic acid, 1,4-phenylenediamine-2-sulfonic acid, 2,4-diaminotoluene, 4,4'-diaminodiphenyl-2,2'-disulfonic acid, 4,4'-diaminodiphenylurea-2,2'-disulfonic acid, 2,5-diaminonapthalene-4,8-disulfonic acid, 4,4'-diaminodiphenyl ether and 2,5-diaminobenzoic acid.

Others of interest are monohalogenpyrimidinyl, dihalogenopyrimidinyl and trihalogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-monochloromethyl- or -5-dichloromethyl- or -5-trichloromethyl- or -5-carbalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyridimine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-sulfonyl, 1,4-dichlorophthalazine-6-sulfonyl or -6-carbonyl, 2,4-dichloroquinazol-7-ine or -6-sulfonyl or -carbonyl, 2- or 3- or 4-(4',5'-dichloropyridaz-6'-on-1'-yl)phenylsulfonyl or -carbonyl, β-(4',5'-dichloropyridaz-6'-on-1'-yl)-ethylcarbonyl, N-methyl-N'-(2,4-dichlorotriazin-6-yl)carbamyl, N-methyl-N-(2-methylamino-4-chlorotriazin-6-yl)carbamyl, N-methyl-N-(2-dimethylamino-4-chlorotriazin-6-yl)carbamyl, N-methyl- or N-ethyl-N-(2,4-dichlorotriazin-6-yl)aminoacetyl, N-methyl-N-(2,3-dichloroquinoxaline-6-sulfonyl)aminoacetyl, N-methyl-N-(2,3-dichloroquinoxaline-6-carbonyl)aminoacetyl, and the corresponding bromine or fluorine derivatives of the abovementioned chlorine-substituted heterocyclic radicals; among these for example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-chloro-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; sulfonyl-containing triazine radicals, such as 2,4-bis-(phenylsulfonyl)-triazin-6-yl, 2-(3'-carboxyphenyl)-sulfonyl-4-chlorotriazin-6-yl, 2-(3'-sulfophenyl)-sulfonyl-4-chlorotriazin-6-yl, 2,4-bis-(3'-carboxyphenylsulfonyl)-triazin-6-yl; sulfonyl-containing pyrimidine rings, such as 2-carboxymethylsulfonyl-pyrimidin-4-yl, 2-methylsulfonyl-6-methylpyrimidin-4-yl, 2-methylsulfonyl-6-ethylpyrimidin-4-yl, 2-phenylsulfonyl-5-chloro-6-methylpyrimidin-4-yl, 2,6-bis-methylsulfonyl-pyrimidin-4-yl, 2,6-bis-methylsulfonyl-5-chloro-pyrimidin-4-yl, 2,4-bis-methylsulfonyl-pyrimidin-5-yl-sulfonyl, 2-methylsulfonylpyrimidin-4-yl, 2-phenylsulfonyl-pyrimidin-4-yl, 2-trichloromethylsulfonyl-6-methyl-pyrimidin-4-yl, 2-methylsulfonyl-5-chloro-6-methyl-pyrimidin-4-yl, 2-methylsulfonyl-5-bromo-6-methyl-pyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methyl-pyrimidine-5-sulfonyl, 2-methylsulfonyl-5-nitro-6-methyl-pyrimidin-4-yl, 2,5,6-tris-methylsulfonyl-pyrimidin-4-yl, 2-methylsulfonyl-5,6-dimethyl-pyrimidin-4-yl, 2-ethylsulfonyl-5-chloro-6-methyl-pyrimidin-4-yl, 2-methylsulfonyl-6-chloro-pyrimidin-4-yl, 2,6-bis-methylsulfonyl-5-chloro-pyrimidin-4-yl, 2-methylsulfonyl-6-carboxy-pyrimidin-4-yl, 2-methylsulfonyl-5-sulfo-pyrimidin-4-yl, 2-methylsulfonyl-6-carbomethoxypyrimidin-4-yl, 2-methylsulfonyl-5-carboxy-pyrimidin-4-yl, 2-methylsulfonyl-5-cyano-6-methoxy-pyrimidin-4-yl, 2-methylsulfonyl-5-chloro-pyrimidin-4-yl, 2-sulfoethylsulfonyl-6-methyl-pyrimidin-4-yl, 2-methylsulfonyl-5-bromo-pyrimidin-4-yl, 2-phenylsulfonyl-5-chloro-pyrimidin-4-yl, 2-carboxymethylsulfonyl-5-chloro-6-methyl-pyrimidin-4-yl, 2-methylsulfonyl-6-chloropyrimidin-4-yl and -5-carbonyl, 2,6-bis-(methylsulfonyl)-pyrimidine-4- or -5-carbonyl, 2-ethylsulfonyl-6-chloropyrimidine-5-carbonyl, 2,4-bis-(methylsulfonyl)pyrimidine-5-sulfonyl, 2-methylsulfonyl-4-chloro-6-methylpyrimidine-5-sulfonyl or -carbonyl; ammonium-containing triazine rings, such as 2-trimethylammonium-4-phenylamino- or -4-(o-, m- or p-sulfophenyl)-amino-triazin-6-yl, 2-(1,1-dimethylhydrazinium)-4-phenylamino- or -4-(o-, m- or p-sulfophenyl)aminotriazin-6-yl, 2-(2-isopropylidene-1,1-dimethyl)-hydrazinium-4-phenylamino- or -4-(o-, m- or p-sulfophenyl)-aminotriazin-6-yl, 2-N-aminopyrrolidinium- or 2-N-aminopiperidinium-4-phenylamino- or -4-(o-, m- or p-sulfophenyl)-aminotriazin-6-yl, and also 4-phenylamino- or 4-(sulfophenylamino)triazin-6-yl radicals which, in the 2-position, contain 1,4-bis-azabicyclo[2.2.2.]octane or 1,2-bis-azabicyclo[0.3.3]octane via a quaternary nitrogen bond, 2-pyridinium-4-phenylamino- or -4-(o-, m- or p-sulfophenyl)-aminotriazin-6-yl and corresponding 2-oniumtriazin-6-yl radicals which are substituted in the 4-position by alkylamino, such as methylamino, ethylamino or β-hydroxyethylamino, or alkoxy, such as methoxy or ethoxy, or aryloxy, such as phenoxy, or sulfophenoxy groups; 2-chlorobenzothiazole-5- or -6-carbonyl or -5- or -6-sulfonyl, 2-arylsulfonyl or -alkylsulfonylbenzotriazole-5- or -6-carbonyl or -5- or -6-sulfonyl, such as 2-methylsulfonyl- or 2-ethylsulfonyl-benzothiazole-5- or -6-sulfonyl or -carbonyl, and the corresponding 2-sulfonylbenzothiazole-5- or -6-carbonyl or -6-sulfonyl derivatives which contain sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl, and the N oxide of 4-chloroquinoline or 4-nitroquinoline-5-carbonyl.

Further examples are reactive groups of the aliphatic series such as monochloroacryloyl, dichloroacryloyl or trichloroacryloyl radicals or monobromoacryloyl or dibromoacryloyl radicals, such as —CO—CH═CH—Cl, —COCCl═CH$_2$, —CO—CCl═CH—CH$_3$, and also —CO—CCl═CH—COOH, —CO—CH═C-Cl—COOH, β-chloropropionyl, 3-phenylsulfonylpropionyl, 3-methylsulfonylpropionyl, β-sulfatoethylaminosulfonyl, vinylsulfonyl, β-chloroethylsulfonyl, β-sulfatoethylsulfonyl, β-methylsulfonylethylsulfonyl, β-phenylsulfonylethylsulfonyl, 2-fluoro-2-chloro-3,3-difluorocyclobutane-1-carbonyl, 2,2,3,3-tetrafluorocyclobutanecarbon-1-yl or -sulfon-1-yl, β-(2,2,3,3-tetrafluorocyclobut-1-yl)acryloyl, α- or β-bromoacryloyl, the α- or β-alkylsulfonyl or -arylsulfonylacryloyl group, such as α- or β-methylsulfonylacryloyl, α,β-dibromopropionyl or α,β-dichloropropionyl and β-chloroethylsulfonylbutyryl.

The cation Ka in formula (1) denotes a hydrogen, sodium, potassium, lithium or ammonium ion or the cation of an organic amine, for example of triethanolamine.

Preferred chromium or cobalt complexes of the formula (1) are those wherein the radicals A and/or B contain at least one water-solubilising group. Suitable water-solubilising groups are: sulfone, sulfonamido, N-monoalkylsulfonamido or N,N-dialkylsulfonamido groups as well as sulfonic acid groups. The radical of formula (2) preferably contains 0, 1,2,3 or 4 sulfonic acid groups.

Suitable sulfone groups are alkylsulfone groups, preferably $C_1$–$C_4$alkylsulfone groups.

A particularly suitable N-monoalkylsulfone or N,N-dialkylsulfone group is one containing one or two $C_1$–$C_4$alkyl groups.

The preferred chromium or cobalt complexes have the formula

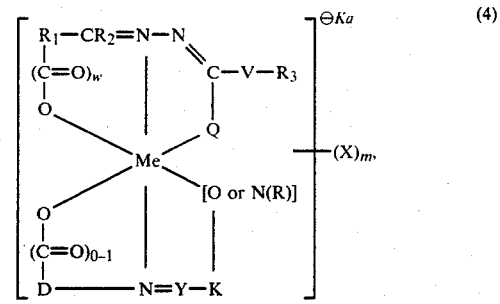

wherein $R_1$ is the direct bond to the —COO radical, an unsubstituted or carboxy-substituted $C_1$–$C_8$alkyl radical, preferably an unsubstituted or carboxy-substituted $C_1$–$C_4$alkyl radical, a $C_1$–$C_8$alkenyl radical, preferably a $C_1$–$C_4$alkenyl radical, or a phenyl or naphthyl radical, each unsubstituted or substituted by $C_1$–$C_4$alkyl, halogen, nitro, $C_2$–$C_4$alkanoylamino, sulfo, carboxy or arylazo, preferably phenylazo, or is a heterocyclic radical, preferably a quinolinyl radical which is substituted by hydroxy, $R_2$ is hydrogen, an unsubstituted or carboxy-substituted $C_1$–$C_8$alkyl or, preferably, $C_1$–$C_4$alkyl radical, or is a phenyl or naphthyl radical, each unsubstituted or substituted by $C_1$–$C_4$alkyl, halogen, nitro, $C_2$–$C_5$alkanoylamino, sulfo or carboxy, V is a direct bond or an oxygen atom, $R_3$ is hydrogen, $C_1$–$C_8$alkyl, preferably $C_1$–$C_4$alkyl, $C_1$–$C_4$phenylalkyl, $C_1$–$C_4$naphthylalkyl, phenyl or naphthyl, each unsubstituted or substituted by $C_1$–$C_4$alkyl, $C_1$–$C_4$alkoxy, halogen, $C_2$–$C_5$alkanoylamino, nitro, hydroxy, cyano, sulfo or phenylazo, or is a radical of the formula

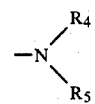

wherein $R_4$ and $R_5$ are each independently of the other hydrogen, unsubstituted or substituted $C_1$–$C_8$alkyl, preferably $C_1-C_4$alkyl, or unsubstituted or substituted phenyl, Q is an oxygen or a sulfur atom, w is 0 or 1, Me is a chromium or cobalt atom, D is the radical of a diazo component of the benzene or naphthalene series which contains the —(CO)$_{\overline{0-1}}$O group ortho to the —N=Y— group, Y is a nitrogen atom or the —CH group, K, if Y is a nitrogen atom, is the radical of a coupling component of the benzene or naphthalene series or of the 5-pyrazolone, 5-aminopyrazolone, quinoline, acetoacetarylide or benzoylacetarylide series, which radical contains the —[O or N(R)]— radical in the vicinal position to the azo group, and R is hydrogen, unsubstituted or substituted $C_1-C_4$alkyl or unsubstituted or substitutd phenyl or, if Y is the —CH— group, K is the radical of an o-hydroxybenzaldehyde or o-hydroxynaphthaldehyde, X is a fibre-reactive radical of the aliphatic or heterocyclic series which is attached to D and/or K and/or $R_1$ direct or through a bridge member, Ka is a cation and m is 1, 2, 3 or 4. In particular, m is 1 or 2.

Also preferred are the chromium or cobalt complexes of formula (4), wherein $R_1$, $R_2$, $R_3$, V, Q and w are as defined in page 6, lines 1 to 20.

X is in particular an acryloyl, monohaloacryloyl, dihaloacryloyl, trihaloacryloyl, monohalomethacryloyl, dihalomethacryloyl, trihalomethacryloyl, monohalopropinyl, dihalopropionyl, phenylsulfonylpropionyl, methylsulfonylpropionyl, vinylsulfonyl, β-chloroethylsulfonyl, β-sulfatoethylsulfonyl, or β-chloroethylsulfonylbutyryl radical, or a radical of the monohalopyrimidyl, dihalopyrimidyl or trihalopyrimidyl series or of the monohalotriazinyl or dihalotriazinyl series, where X may be attached to D and/or K and/or $R_1$ through a bridge member of the formula

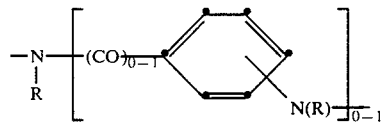

or —CH$_2$—N(R)—, and R is as defined for formula (2). Most particularly, X is the α,β-dibromopropionyl or α-bromoacryloyl radical which is attached to D and/or K through an amino group.

Particularly preferred chromium or cobalt complexes are those of the formula

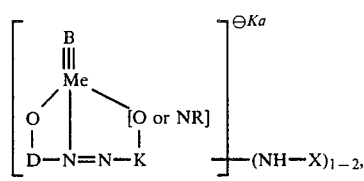

(5)

wherein B is the radical of the formula

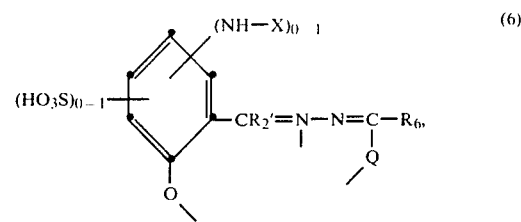

(6)

wherein $R_2'$ is hydrogen or methyl, $R_6$ is hydrogen, methyl, phenyl or NH$_2$, and Q is an oxygen or sulfur atom; or is the radical of the formula

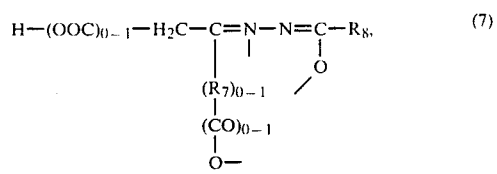

(7)

wherein $R_7$ is $C_1-C_4$alkyl and $R_8$ is methyl or phenyl; or is the radical of the formula

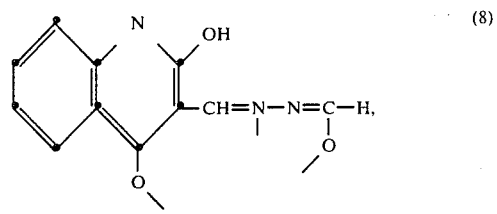

(8)

or the radical of the formula

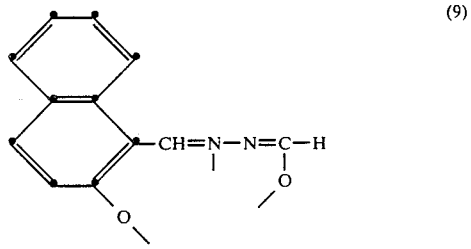

(9)

and D is a benzene nucleus which contains the oxygen atom ortho to the azo bridge and which may be substituted by sulfo, chlorine, nitro, methoxy and the —NH—X radical, or is a naphthalene nucleus which contains the oxygen atom in the 1- or 2-position and the azo group in the 2- or 1-position and which may be substituted by sulfo, nitro and the —NH—X radical; K is a naphthalene nucleus which may be substituted by 1 or 2 sulfo groups in addition to the NH—X radical and contains the oxygen atom or —N(R), where R is hydrogen or phenyl, ortho to the azo group, or is a 1-phenyl-3-methyl-5-pyrazolone radical which may be substituted in the phenyl ring by the —NH—X radical or sulfo, or is a dimethylphenol or tert-butylphenol radical which is substituted by the oxygen atom ortho to the azo group, or is a 2-hydroxyquinolinyl radical which contains the azo group in the 3-position and the oxygen atom in the 4-position, and X is the α,β-dibromopropionyl, α-bromoacryloyl, chloroacetyl, β-chloropropionyl, 2-fluoro-4-(N-ethyl-N-phenylamino), 1,3,5-triazin-6-yl, 2-fluoro-4-methoxy- or 4-β-ethoxyethoxy-1,3,5-triazin-6-yl, 2-chloro-4-phenylamino-1,3,5-triazin-6-yl, 2-chloro-4-methoxy- or -4-ethoxy- or -4-isopropoxy-1,3,5-triazin-6-yl or 2,4-difluoro-5-chloropyrimidin-6-yl radical, Me is a chromium or cobalt atom, and Ka is an alkali cation.

In formulae (1), (4) and (5), Me is preferably the chromium atom.

Further preferred chromium or cobalt complexes are those of the formula (5), wherein B is the radical of the formula (6) and X is the α,β-dibromopropionyl radical. Y in formulae (2) and (4) is preferably the nitrogen atom.

Most preferred are the chromium complexes of formula (5), wherein K is a naphthalene nucleus which may be substituted by 1 or 2 sulfo groups in addition to the —NH—X radical and which contains the oxygen atom ortho to the azo group.

Particularly interesting chromium complexes are those of the formula

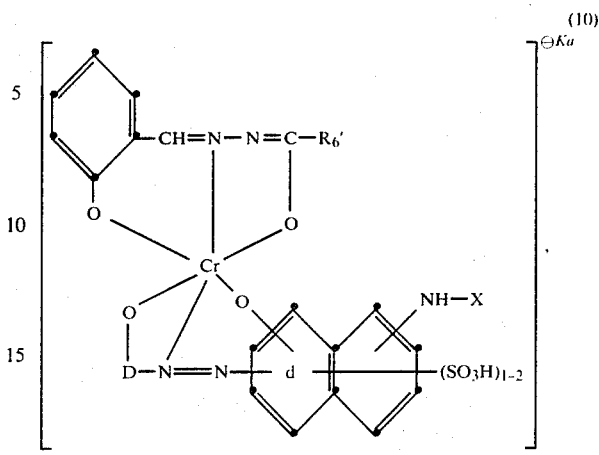

wherein $R_6'$ is hydrogen, methyl, phenyl or amino, D is a benzene nucleus which contains the oxygen atom ortho to the azo bridge and may be substituted by chlorine or nitro, or is a naphthalene nucleus which contains the oxygen atom in the 1- or 2-position and the azo group in the 2- or 1-position and which may be substituted by sulfo or nitro, and X is an α,β-dibromopropionyl or α-bromoacryloyl radical, and wherein the azo group is attached to the ring d ortho to the oxygen atom, and Ka is an alkali cation.

The chromium complex of the formula

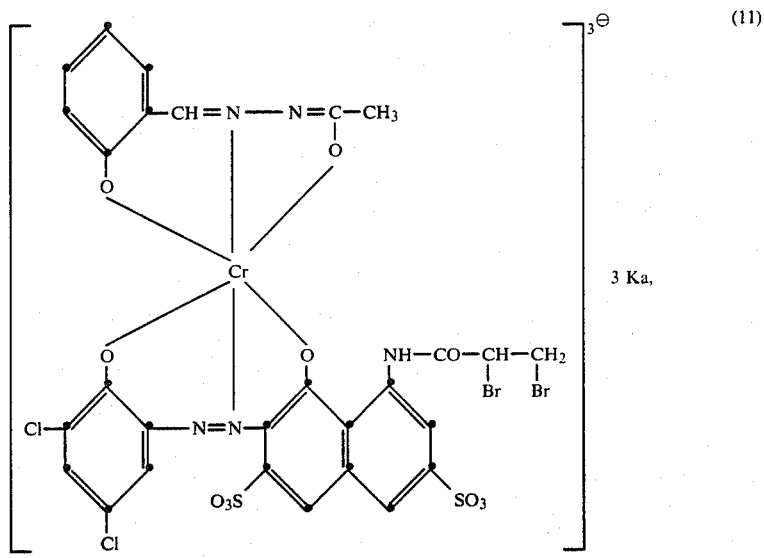

wherein Ka is an alkali cation, is most preferred.

The present invention further relates to a process for the preparation of chromium complexes of the formula (1), which process comprises reacting a compound which introduces the radical B, or precursors thereof, with a 1:1 complex of the formula

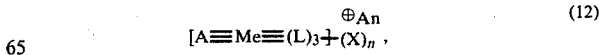

wherein A, Me and X are as defined for formula (1), An is an anion, n is 0, 1, 2, 3 or 4 and L is a colourless ligand which may stabilise the 1:1 complex, in aqueous, organic or aqueous-organic medium, and if desired, subsequently reacting the resultant chromium or cobalt complex with a compound that introduces the fibre-reactive radical or radicals X.

The compound which introduces the radical B is preferably reacted with the 1:1 chromium or cobalt complex of the formula (12) in the temperature range from 50° to 100° C. and in the pH range from 5 to 9. The reaction with a compound that introduces the radical or radicals X is preferably carried out in the temperature range from 15° to 30° C. and at a pH from 5 to 8.

Many metallisable azo and azomethine dyes which are able to donate the radical A are known from the literature. Examples of such dyes are o,o'-dihydroxyazo, o-carboxy-o'-hydroxyazo, o-hydroxy-o-aminoazo or -azomethine compounds, in particular of the formula

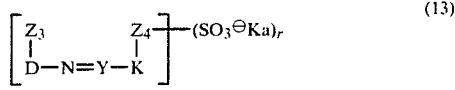  (13)

wherein $Z_3$ is the hydroxyl, carboxyl or methoxy group, $Z_4$ is the hydroxyl or —HN(R) group, and D, K, Y, Ka and R are as defined for formula (2), and r is 0, 1, 2, 3 or 4, and D and K may contain functional groups which are suitable for introducing the fibre-reactive group or groups X, for example amino groups or groups that may be converted into amino groups, for example the acetylamino group or the nitro group. The compounds of formula (13), wherein Y is a nitrogen atom, are prepared in a manner known per se by diazotising an amine of formula

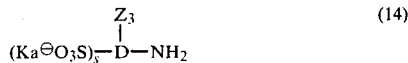  (14)

and coupling the diazonium salt to a coupling component of the formula

  (15)

wherein D, K, $Z_3$, $Z_4$ and Ka are as defined for formula (13) and the sum of s+t is r.

The diazotisation of the diazo component of the formula (14) is normally effected by treatment with nitrous acid in an aqueous solution of mineral acid at low temperature, and the coupling to the coupling component of the formula (15) is carried out in the acid, neutral or alkaline pH range.

Examples of suitable amines of formula (14) are: 2-amino-1-hydroxybenzene, 2-amino-1-methoxybenzene, anthranilic acid, 4- or 5-sulfonamidoanthranilic acid, 3- or 5-chloroanthranilic acid, 4-chloro- and 4,6-dichloro-2-amino-1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and -5-benzylsulfone, 2-amino-1-hydroxybenzene-4-methyl- , -ethyl-, -chloromethyl- and -butylsulfone, 6-chloro-, 5-nitro- and 6-nitro-2-amino-1-hydroxybenzene-4-methylsulfone, 2-amino-1-hydroxybenzene-4- or -5-sulfamide, 2-amino-1-hydroxybenzene-4- or -5-sulf-N-metylamide and 2-amino-1-hydroxybenzene-4- or -5-sulf-N-β-hydroxyethylamide, 2-amino-1-methoxybenzene-4-sulfanilide, 4-methoxy-5-chloro-2-amino-1-hydroxybenzene, 4-methyl-2-amino-1-hydroxybenzene, 4-chloro-5-nitro-2-amino-1-hydroxybenzene, 5-nitro-4-methyl-2-amino-1-hydroxybenzene, 5-nitro-4-methoxy-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5- or -6-sulfonamide, 4- or 5-chloroanisidine, 4- or 5-nitroanisidine, 2-methoxy-5-methylaniline, 2,5-dimethoxyaniline, 2-anisidine-4- or -5-β-hydroxyethylsulfone, 4-methyl-6-sulfo-2-amino-1-hydroxybenzene, 2-amino-4-sulfo-1-hydroxybenzene, 4-chloro-6-sulfo-2-amino-1-hydroxybenzene, 6-chloro-4-sulfo-2-amino-1-hydroxybenzene, 5-nitro-4-sulfo-2-amino-1-hydroxybenzene, 4-nitro-6-sulfo-2-amino-1-hydroxybenzene, 6-nitro-4-sulfo-2-amino-1-hydroxybenzene, 4-acetylamino-2-amino-1-hydroxybenzene, 4-acetylamino-6-sulfo-2-amino-1-hydroxybenzene, 5-acetylamino-2-amino-1-hydroxybenzene, 6-acetylamino-4-sulfo-2-amino-1-hydroxybenzene, 4-chloro-2-amino-1-hydroxybenzene-5-sulfamide, 2-amino-1-hydroxybenzene-4-(N-2'-carboxyphenyl)sulfamide, 1-amino-2-hydroxy-4-sulfonaphthalene, 1-amino-2-hydroxy-4-sulfo-6-nitronaphthalene, 1-amino-2-hydroxy-4-sulfo-6-acetamidonaphthalene, 1-amino-2-hydroxy-4,8-disulfonaphthalene, 1-amino-2-hydroxy-6-sulfonaphthalene, 1-amino-2-hydroxy-7-sulfonaphthalene, 1-amino-2-hydroxy-8-sulfonaphthalene, 2-amino-1-hydroxy-4-sulfonaphthalene, 2-amino-1-hydroxy-6-sulfonaphthalene.

The coupling components of formula (15) can be derived for example from the following groups of coupling components:

Naphthols which couple in the ortho-position to the —OH group and are unsubstituted or substituted by chlorine, amino, acylamino, acyl, $C_1-C_4$alkyl, $C_1-C_4$alkoxy, sulfonamido, N-monosubstituted or N,N-disubstituted sulfonamido groups, sulfo and sulfone groups.

Naphthylamines which couple in the ortho-position to the amino group and are unsubstituted or substituted by halogen, preferably bromine, $C_1-C_4$alkyl, $C_1-C_4$alkoxy, sulfonamido, monosubstituted or disubstituted sulfonamido, sulfo or sulfone groups.

5-Pyrazolones and 5-aminopyrazoles which carry in the 1-position a phenyl or naphthyl radical which is unsubstituted or substituted by halogen, for example chlorine, or nitro, $C_1-C_4$alkyl and $C_1-C_4$alkoxy groups, sulfonamido, N-alkylated sulfonamido groups, sulfo or sulfone groups, and, in particular, by amino groups.

2,6-Dihydroxy-3-cyano- or 3-carbonamido-4-alkylpyridines and 6-hydroxy-2-pyridones which are substituted in the 1-position by unsubstituted or substituted $C_1$–$C_4$alkyl, for example methyl, isopropyl, β-hydroxyethyl, β-aminoethyl, γ-isopropoxypropyl or by —$NH_2$, or by a substituted amino group such as dimethylamino or diethylamino, and which carry in the 3-position a cyano or carbonamido group and, in the 4-position, a $C_1$–$C_4$alkyl group, preferably a methyl group.

Acetoacetanilides and benzoylacetanilides which may be substituted in the anilide nucleus by $C_1$–$C_4$alkyl, $C_1$–$C_4$alkoxy or $C_1$–$C_4$alkylsulfonyl groups, $C_1$–$C_4$hydroxyalkyl, alkoxyalkyl or cyanoalkylsulfonyl groups, sulfonamido groups, N-alkylated sulfonamido groups, sulfo, acetylamino and halogen.

Phenols which are substituted by low molecular acylamino groups and/or $C_1$–$C_5$alkyl groups and which couple in the ortho-position.

Hydroxyquinolines which are unsubstituted or substituted by hydroxy.

Examples of such coupling components are: 2-naphthol, 1-naphthol, 1-hydroxynaphthalene-4-, 5- or -8-sulfonic acid, 1,3- or 1,5-dihydroxynaphthalene, 1-hydroxy-7-aminonaphthalene-3-sulfonic acid, 2-naphthol-6-sulfonamide, 1-hydroxy-7-N-methyl- or N-acetylaminonaphthalene-3-sulfonic acid, 2-naphthol-6-β-hydroxyethylsulfone, 1-hydroxy-6-amino- or -6-N-methyl- or -6-N-acetylaminonaphthalene-3-sulfonic acid, 1-hydroxy-7-aminonaphthalene-3,6-disulfonic acid, 1-hydroxy-6-aminonaphthalene-3,5- or -4,8-disulfonic acid, 1-acetylamino-7-naphthol, 1-hydroxy-6-N-(4'-aminophenyl)aminonaphthalene-3-sulfonic acid, 1-hydroxy-5-aminonaphthalene-3-sulfonic acid, 1-propionylamino-7-naphthol, 2-hydroxy-6-aminonaphthalene-4-sulfonic acid, 1-carbomethoxyamino-7-naphthol, 1-hydroxy-8-aminonaphthalene-5-sulfonic acid, 1-carboethoxy-amino-7-naphthol, 1-hydroxy-8-aminonaphthalene-5,7-disulfonic acid, 1-carbopropoxyamino-7-naphthol, 1-hydroxy-8-aminonaphthalene-3-sulfonic acid, 1-dimethylaminosulfonylamino-7-naphthol, 6-acetylamino-2-naphthol, 1-hydroxy-8-aminonaphthalene-3,5- or -3,6-disulfonic acid, 4-acetylamino-2-naphthol, 2-hydroxy-5-aminonaphthalene-4,7-disulfonic acid, 4-methoxy-1-naphthol, 4-acetylamino-1-naphthol, 1-naphthol-3, -4- or -5-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1- or -6-sulfonic acid, 2-aminonaphthalene-5-, -6- or -7-sulfonamide, 2-amino-6-N-(methyl, ethyl, isopropyl, β-oxyethyl or γ-methoxypropyl)naphthalene-6-sulfonamide, 2-aminonaphthalene-6-sulfanilide, 2-aminonaphthalene-6-N-methylsulfonanilide, 1-aminonaphthalene-3-, -4- or -5-sulfonamide, 1-aminonaphthalene-5-methyl- or -ethylsulfone, 5,8-dichloro-1-aminonaphthalene, 2-phenylaminonaphthalene, 2-N-methylaminonaphthalene, 2-N-ethylaminonaphthalene, 2-phenylaminonaphthalene-6-sulfonic acid, 2-phenylaminonaphthalene-5-, -6- or -7-sulfonamide, 2-(3'-chlorophenylamino)naphthalene-5-, -6- or -7-sulfonamide, 6-methyl-2-aminonaphthalene, 6-bromo-2-aminonaphthalene, 6-methoxy-2-aminonaphthalene, 1,3-dimethylpyrazolone, 3-methyl-5-pyrazolone, 1-phenyl-3-methyl-5-pyrazolone, 1-phenyl-3-carbonamido-5-pyrazolone, 1-(2'-, 3'- or 4'-methylphenyl)-3-methyl-5-pyrazolone, 1-[3'- or 4'-(β-hydroxyethylsulfonyl)phenyl]-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-(2'- , 3'- or 4'-nitrophenyl)-3-methyl-5-pyrazolone, 1-(2',5'- or 3',4'-dichlorophenyl)-3-methyl-5-pyrazolone, 1-(2'-, 3'- or 4'-sulfamoylphenyl)-3-methyl-5-pyrazolone, 1-(2'-, 3'- or 4'-methylsulfonylphenyl)-3-methyl-5-pyrazolone, 2,6-dihydroxy-3-cyano-4-methylpyridine, 1-methyl-3-cyano-4-ethyl-6-hydroxypyrid-2-one, 1-amino-3-cyano-4-methyl-6-hydroxypyrid-2-one, 1-phenyl-3-carbonamido-4-methyl-6-hydroxypyrid-2-one, acetoacetanilide, acetoacet-o-, -m- or -p-sulfoanilide, acetoacet-4-(β-hydroxyethylsulfonyl)anilide, acetoacet-o-anisidide, acetoacetnaphthylamide, acetoacet-o-toluidide, acetoacet-o-chloroanilide, acetoacet-m- or -p-chloroanilide, acetoacetanilide-3- or -4-sulfonamide, acetoacet-3- or -4-aminoanilide, acetoacet-m-xylidide, benzoylacetanilide, 4-methylphenol, 3-dialkylaminophenol, in particular 3-dimethylamino- and 3-diethylaminophenol, 4-t-butylphenol, 4-t-amylphenol, 2- or 3-acetylamino-4-methylphenol, 2-methoxycarbonylamino-4-methylphenol, 2-ethoxycarbonylamino-4-methylphenol, 3,4-dimethylphenol and 2,4-dimethylphenol, 1-(4'-aminophenyl)-3-methyl-5-pyrazolone, 1-(2'-, 3'- or 4'-sulfophenyl)-3-methyl-5-pyrazolone, 1-(2'-chloro-4'- or 5'-sulfophenyl)-3-methyl-5-pyrazolone, 1-(2'-methyl-6'-chlorophenyl)-3-methyl-5-pyrazolone, 1-(2'-methyl-4'-sulfophenyl)-3-methyl-5-pyrazolone, 1-(2'- , 3'- or 4'-chloro- or methyl- or sulfophenyl)-3-carboxy-5-pyrazolone, 1-[5'-sulfonaphth-2-yl]3-methyl-5-pyrazolone, 1-[4''-amino-2-',2''-disulfo-4'-stilbene]-3-methyl-5-pyrazolone, 1-ethyl-3-cyano-4-methyl-6-hydroxypyrid-2-one, 1-ethyl-3-sulfomethyl-4-methyl-6-hydroxypyrid-2-one, 2,6-dihydroxy-3-cyano-4-sulfomethylpyrimidine, 2,4,6-trihydroxypyrimidine, 2,4-dihydroxyquinoline.

To prepare the azomethine dyes of the formula (13), the amines of formula (14) specified above are condensed in known manner with o-hydroxybenzaldehydes or o-hydroxynaphthaldehydes.

Examples of suitable aldehydes are: 2-hydroxybenzaldehyde, 3- and 5-methyl-2-hydroxybenzaldehyde, 3,5- and 3,6-dimethyl-2-hydroxybenzaldehyde, 5-butyl-2-hydroxybenzaldehyde, 5-chloro- or 5-bromo-2-hydroxybenzaldehyde, 3- and 4-chloro-2-hydroxybenzaldehyde, 3,5-dichloro-2-hydroxybenzaldehyde, 3-chloro-5-methyl-2-hydroxybenzaldehyde, 3-methyl-5-chloro-2-hydroxybenzaldehyde, 3- and 4- and 5-nitro-2-hydroxybenzaldehyde, 3,5-dinitro- and 4-chloro-5-nitro-2-hydroxybenzaldehyde, 4-methoxy-2-hydroxybenzaldehyde, 1-hydroxy-2-naphthaldehyde and its derivative which is chlorinated in the 4-position; and 2-hydroxy-1-naphthaldehyde.

Preferred chromium and cobalt complexes of this invention are those wherein Y is a nitrogen atom and K is the radical of a coupling component of the naphthalene series.

If desired, a free amino group in the radical D and/or K can be converted into an acylamino or alkylamino group after coupling with an acylating or alkylating agent, and likewise a hydroxyl group in the radical D and/or K can be converted by alkylation into an alkoxy group.

A further embodiment of the process for the preparation of the 1:1 chromium or cobalt complex azomethine dye of the formula (12) resides in the feature that the 1:1 chromium or cobalt complex of the formula (12) can also be prepared with a mixture of the amine of formula (14) and an o-hydroxyaldehyde instead of with the azomethine of the formula (13).

The amines of formula (14), the coupling components of formula (15) and the o-hydroxyaldehydes can contain radicals which can be converted into amino groups, for example the acetylamino group or the nitro group. For example, an acetylamino group can be converted by saponification, and a nitro group by reduction, into amino groups, advantageously after the preparation of the dyes of formula (13) or after the preparation of the 1:1 chromium or cobalt complex of formula (12).

The preparation of the 1:1 chromium or cobalt complexes is effected by methods which are known per se. For example, the 1:1 chromium complex of the compound of formula (12) is prepared by reacting the metal-free compound, in acid medium, with a salt of trivalent chromium such as chromium chloride, chromium fluoride or chromium sulfate, optionally in the presence of solubilisers or chroming catalysts, for example alcohols or hydroxycarboxylic acids. Then the 1:1 complex is reacted, in the pH range from 5 to 9, with a compound which introduces the radical B.

The preparation of the 1:1 cobalt complexes of the formula (12) is effected by methods which are known per se. For example, the 1:1 complex of the formula (12) is prepared by reacting the metal-free compound, in a manner known per se, with a colourless cobalt(III) complex compound in a weakly acid, neutral or alkaline solution or dispersion. Suitable cobalt(III) complex compounds are the reaction products of a colourless complexing or chelating agent such as diethylenetriamine, ammonia or $NO_2^\ominus$ ions, with a cobalt(II) or cobalt(III) salt such as cobalt(III) hexamine, cobalt(III) trichloride, cobalt(II) chloride, cobalt(II) sulfate or cobalt(II) acetate.

The reaction to give the cobalt complex of formula (1) is carried out in the pH range from 5 to 9 with a compound that introduces the radical B.

The metallising of the azo or azomethine compound is preferably carried out in aqueous solution, optionally with the addition of an organic solvent such as an alcohol or dimethylformamide, or else in a pure organic solvent, for example in an alcohol a glycol, a glycol ether or glycol ester, glycerol or a ketone, for example methyl isobutyl ketone. Metallising is conveniently effected in weakly acid or alkaline medium, preferably in the pH range from 5 to 9. To hasten the metallising, an oxidising agent such as hydrogen peroxide or nitrobenzenesulfonic acid can be added to the reaction solution.

Suitable compounds that introduce the radical B are complexable acyl hydrazones, semicarbazones or thiosemicarbazones, or precursors thereof, which are able to form two covalent bonds and one co-ordinative bond with the chromium or cobalt atom.

Particularly preferred compounds that introduce the radical B are the compounds of formula

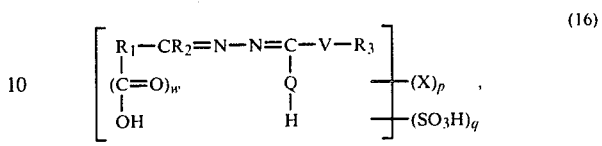

wherein $R_1$, $R_2$, V, $R_3$, Q, X, w and p are as defined for formula (3), and q is 0, 1 or 2. The compounds of formula (16), which are devoid of sulfo groups, are known and are prepared by methods which are known per se. The compounds of formula (16), wherein $R_1$ is a direct bond, an alkyl preferably $C_1$–$C_8$alkyl, or alkenyl, preferably $C_1$–$C_8$alkenyl radical which is unsubstituted or substituted by halogen, $C_1$–$C_4$alkoxy, phenyl, naphthyl, carboxy, $C_1$–$C_8$alkoxycarbonyl, phenoxycarbonyl, $C_1$–$C_8$alkylaminocarbonyl or phenylaminocarbonyl, or is a phenyl or naphthyl radical, each unsubstituted or substituted by $C_1$–$C_4$alkyl, $C_1$–$C_4$alkoxy, halogen, $C_2$–$C_5$alkanoylamino, nitro or cyano, or is a heterocyclic radical, $R_2$ is hydrogen or an alkyl, preferably $C_1$–$C_8$alkyl, phenyl or naphthyl radical which can be substituted as indicated for the alkyl, phenyl or naphthyl radical $R_1$, V is a direct bond or an oxygen atom, $R_3$ is hydrogen, an alkyl, preferably $C_1$–$C_8$alkyl, phenyl or naphthyl radical which may be substituted as indicated for the alkyl, phenyl or naphthyl radical $R_1$, or is heterocyclic radical or an unsubstituted or substituted amino group, Q is an oxygen or sulfur atom, X is a fibre-reactive radical, p is 0, 1 or 2 and q is 1 or 2, and the chromium and cobalt complexes thereof, are novel and constitute a further object of the invention. They are prepared by reacting, for example, a hydrazide of formula

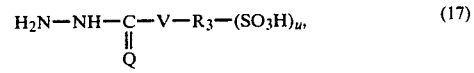

wherein Q, V and $R_3$ are as defined above, and u is 0, 1 or 2, in a manner known per se, with a complexable carbonyl compound of the formula

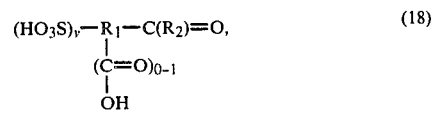

wherein $R_1$ and $R_2$ are as defined above, and v is 0, 1 or 2, with the proviso that the sum of u+v must be 1 or 2; or by reacting a hydrazide of formula (17) with an aldimine of the formula

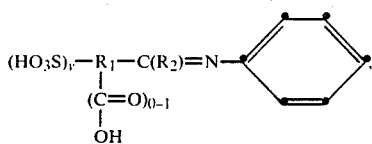
(19)

wherein $R_1$, $R_2$ and v are as defined for formula (18), and the sum of u+v must be 1 or 2; or by reacting a complexable hydrazone of formula

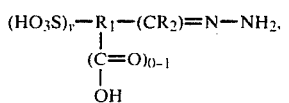
(20)

wherein $R_1$, $R_2$ and v are as defined for formula (18), in a manner known per se, with a compound which forms the radical of the formula

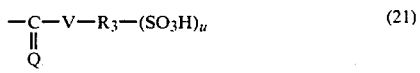
(21)

wherein Q, V, $R_3$ and u are as defined for formula (16), and the sum of u+v must be 1 or 2.

Examples of suitable compounds which form the radical of the formula (21) are those of the formula

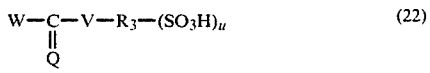
(22)

wherein Q, V, $R_3$ and u are as defined for formula (21), and W is a removable radical, for example the radical of an anhydride, or a halogen atom, preferably a chlorine or bromine atom.

Representative examples of compounds of formula (15) are: monoformylhydrazine, monoacetylhydrazine, monopropionylhydrazine, monobenzoylhydrazine, mono-(4-chlorobenzoyl or 4-nitrobenzoyl)hydrazine, semicarbazide, thiosemicarbazide, salicylhydrazide, 5-hydroxysalicylhydrazide, 4-trifluoromethylsalicylhydrazide, pyridinecarboxylic acid hydrazide, 6-chloro-3-hydroxyquinoline-4-carboxylic acid hydrazide.

Representative examples of compounds of formula (18) are: 4-chlorosalicycaldehyde, 5-chlorosalicylaldehyde, 3-nitrosalicylaldehyde, 5-nitrosalicylaldehyde, 3,5-dichlorosalicylaldehyde, 3,5-dibromosalicylaldehyde, 5-sulfosalicylaldehyde, 2-hydroxynaphthaldehyde, 6-bromo-2-hydroxynaphthaldehyde, 5-nitro-2-hydroxynaphthaldehyde, 2-hydroxy-3-carboxynaphthaldehyde, 2-hydroxy-3-methoxycarbonylnaphthaldehyde, 2-hydroxy-3-phenylcarbamoylnaphthaldehyde, 2,6-dihydroxy-4-methyl-5-cyano-3-pyridinaldehyde, 2,6-dihydroxy-4-methyl-5-carbamoyl-3-pyridinaldehyde, 2,4-dihydroxyquinoline-3-aldehyde, 2,4-dihydroxy-3-acetylquinoline, 2-hydroxyacetophenone, 2-hydroxybenzophenone, glycolaldehyde, glyoxylic acid, pyruvic acid, acetonedicarboxylic acid, methyl, ethyl or propyl acetate, acetylacetone, diacetone alcohol, 2-phenyl-4,6-dihydroxy-5-pyrimidinaldehyde, 1-phenyl-3-methyl-4-formyl-5-hydroxypyrazole.

Suitable compounds of the formula (19) are the same compounds cited as exemplary of compounds of formula (18), but which carry a phenylaldimine radical instead of the carbonyl group.

Suitable compounds of the formula (20) are the reaction products of the compounds cited as exemplary of compounds of the formula (18) with hydrazine.

Typical examples of compounds of the formula (22) are: acetic anhydride; propionic anhydride, methyl acetate, ethyl acetate, methyl propionate, ethyl propionate, methyl formate and ethyl formate.

Preferred compounds are the compounds of formula (16) which contain sulfo groups, wherein $R_1$ is phenyl, $R_2$ is hydrogen, V is a direct bond, $R_3$ is hydrogen, $C_1$–$C_4$alkyl, phenyl or amino, w is 0, Q is an oxygen or sulfur atom, p is 0 and q is 1.

The sulfo group is preferably attached to $R_1$. Suitable fibre-reactive radicals X are the radicals referred to above which are attached to $R_3$, or preferably to $R_1$, through an amino group or through a bridge member that contains an amino group.

The chromium or cobalt complexes of formula (1) can also be prepared by reacting the 1:1 chromium or cobalt complex of the formula (12) with precursors of the compound that introduces the radical B. These process variants comprise (a) using as precursor of the compound that introduces the radical B a complexable hydrazide together with a complexable carbonyl compound;

(b) using as precursor of the compound that introduces the radical B a complexable hydrazone together with a complexable acyl radical.

A further embodiment of the process of the invention comprises reacting a compound that introduces the radical B with an agent that introduces the chromium atom to give the 1:1 chromium complex, and subsequently reacting the 1:1 chromium complex with a metal-free complexable azo or azomethine dye.

If the compounds employed as compounds that introduce the radical B are those of the formula (16), wherein q is 1 or 2, then these 1:1 chromium or cobalt complexes are novel.

If the reactive group or groups X in the chromium or cobalt complex of the formula (1) are attached to the radical A, then the introduction of the reactive group or groups is conveniently effected after the preparation of the 1:1 chromium complex of the formula (12) or preferably after the reaction of the 1:1 chromium complex of the formula (12) with the organic compound that introduces the radical B. If the reactive group or groups X in the chromium or cobalt complex of the formula (1) are attached to the radical B, then the introduction of said group or groups is preferably effected after the reaction with the 1:1 chromium complex of the formula (12).

The introduction of the fibre-reactive group or groups X into the 1:1 chromium or cobalt complex of the formula (12) or into the chromium or cobalt complex of the formula (16) is carried out in a manner known per se by reacting said chromium or cobalt complexes with one or up to four agents that introduce the radical or radicals X, while the radicals A and/or B in the formulae (12) and (16) must contain functional groups that make possible the bonding of the fibre-reactive group or groups X. Such groups that are suitable for bonding the groups X are, for example, monoalkylated amino groups, for example —NH₂, —N(CH₃)H or —N(C₂H₅)H or the β-oxyethylsulfonyl group.

The introduction of the reactive group or groups which are bonded through an oxy, thio or, preferably, amino group, is effected by reacting the chromium or cobalt complexes of the formula (12) and (16) with one or more acylating agents that introduces one or up to four identical or different radicals X.

7-7.5. After addition of 17.9 parts of the acylhydrazone compound obtained from salicylaldehyde and monoacetylhydrazine, the reaction mixture is stirred until no more starting material can be detected. After cooling to about 30° C., 15 parts of sodium bicarbonate are added to the resultant clear blue solution, which is then further cooled to about 10° C. with 200 parts of ice. Then 30 parts of 1,2-dibromopropionyl chloride, diluted with 30 parts of acetone, are added dropwise over 1 hour. Stirring is continued for 3 hours without cooling and the deep blue dye solution is evaporated to dryness at 50°-60° C. in vacuo. The novel dye of the structure

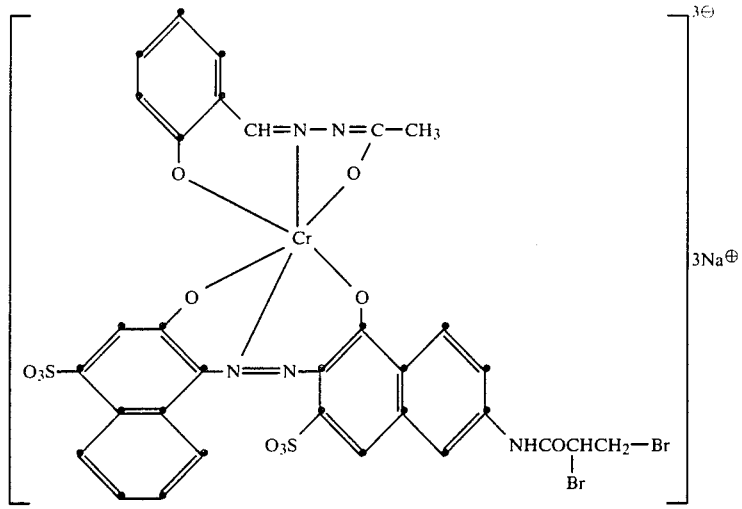

The formation of the fibre-reactive group or groups bonded direct to the radicals A and/or B, for example the β-sulfatoethylsulfonyl group, is effected in a manner known per se, for example by sulfating the above-mentioned β-oxyethylsulfonyl group.

The chromium or cobalt complexes of the formula (1) are suitable for dyeing nitrogen-containing materials and materials that contain hydroxyl groups, for example cotton, silk, leather and, in particular, wool and synthetic polyamides. Level dyeings in yellow, brown, orange, red, blue, grey, green and black shades of good allround fastness properties are obtained, in particular very good fastness to rubbing, wet treatments, wet rubbing and light. In addition, the dyes of this invention can be readily combined with other fibre-reactive acid dyes. The above-mentioned textile material can be in a wide variety of processing forms, for example as filaments, yarn, woven or knitted fabrics.

In the following Examples parts are by weight. The relationship between parts by weight and parts by volume is the same as that between the gram and the cubic centimeter.

EXAMPLE 1

53.9 parts of the monoazo dye obtained from diazotised 1-amino-2-hydroxynaphthalene-4-sulfonic acid and 1-hydroxy-6-aminonaphthalene-3-sulfonic acid in the form of the 1:1 chromium complex containing 1 atom of chromium per molecule of azo dye are suspended in 500 parts of water at about 70° C. and dissolved by adding 2N sodium hydroxide solution at pH is very readily soluble in water and dyes normal or non-felting wool by the process of Dyeing Example 3 in full dark blue shades of excellent fastness properties.

Preparation of the hydrazone compound: 24 parts of salicylaldehyde are mixed with 200 parts of ethyl alcohol. After addition of 14.8 parts of monoacetylhydrazine, the reaction mixture is heated, with stirring, to the boil and kept at reflux for 2 hours. After cooling to 5°-10° C., the crystallised precipitate is isolated by filtration, washed with cold ethyl alcohol and recrystallised from the same solvent. The compound, which is obtained in a yield of 92% of theory, forms faintly yellowish needle-shaped crystals which melt at 199°-201° C. and has the structure:

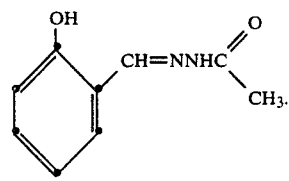

Further reactive metal complex dyes with similar properties are obtained in analogous manner by reacting 1:1 chromium complexes of the monazo dyes listed in column I of the following Table with the acylhydrazones of column II and subsequently acylating the resultant chromium complex with the acylating agents of column III. Column IV indicates the shades obtained on wool with the novel dyes.

| Example | I | II | III | IV |
|---|---|---|---|---|
| 2 | (structure: HO₃S–C₆H₃(OH)(Cl)–N=N–C₆H₂(OH)(SO₃H)–NH₂) | 2-hydroxybenzaldehyde CH=NNHC(O)CH₃ | BrCH₂CHClC(O)Br | grey |
| 3 | (structure: HO₃S–C₆H₃(OH)(Cl)–N=N–C₆H₂(OH)(SO₃H)–NH₂) | 2-hydroxybenzaldehyde CH=NNHC(O)–C₆H₅ | BrCH₂CHClC(O)Br | grey |
| 4 | (structure: HO₃S–naphthalene(OH)–N=N–naphthalene(OH)(SO₃H)–NH₂) | 2-hydroxybenzaldehyde CH=NNHC(O)–C₆H₅ | BrCH₂CHClC(O)Br | dark blue |
| 5 | (structure: HO₃S–naphthalene(OH)–N=N–naphthalene(OH)(SO₃H)–NH₂) | 2-hydroxybenzaldehyde CH=NNHC(O)H | BrCH₂CHClC(O)Br | blue |

-continued

| Example I | | II | | III | IV |
|---|---|---|---|---|---|
| 6 | (naphthalene-azo-naphthalene structure with HO₃S, OH, N=N, OH, HO₃S, NH₂) | COOH, C=NNHCCH₃ with O and CH₃ | | BrCH₂CHCCl with O and Br | blue |
| 7 | (naphthalene-azo-naphthalene structure with HO₃S, OH, N=N, OH, HO₃S, NH₂) | COOH, C=NNHC with O, and phenyl ring | | BrCH₂CHCCl with O and Br | dark blue |
| 8 | (naphthalene-azo-naphthalene structure with HO₃S, OH, N=N, OH, HO₃S, NH₂) | COOH, CH₂, C=NNHC, CH₂, COOH with O, and phenyl ring | | BrCH₂CHCCl with O and Br | dark blue |
| 9 | (naphthalene-azo-naphthalene structure with HO₃S, OH, N=N, OH, HO₃S, NH₂, O₂N) | OH, CH=NNHCH with O, and phenyl ring | | BrCH₂CHCCl with O and Br | grey |

-continued

| Example | I | II | III | IV |
|---|---|---|---|---|
| 10 | (naphthalene: HO₃S, OH, N=N, HO₃S, OH, NH₂, O₂N) | 2-hydroxyphenyl-CH=NNHC(O)CH₃ | BrCH₂CHClC(O)Br | grey |
| 11 | (naphthalene: HO₃S, OH, N=N, HO₃S, OH, NH₂, O₂N) | 2-hydroxyphenyl-CH=NNHC(O)-phenyl | BrCH₂CHClC(O)Br | greenish grey |
| 12 | (naphthalene: HO₃S, OH, N=N, HO₃S, OH, NH₂, O₂N) | HOOC-CH₂-C(=NNHC(O)-phenyl)-CH₂-COOH | BrCH₂CHClC(O)Br | bluish grey |
| 13 | (naphthalene: HO₃S, OH, N=N, HO₃S, OH, NH₂, H₂N) | 2-hydroxyphenyl-CH=NNHCH(O) | BrCH₂CHClC(O)Br | dark blue |

-continued
| Example | I | II | III | IV |
|---|---|---|---|---|
| 14 |  | 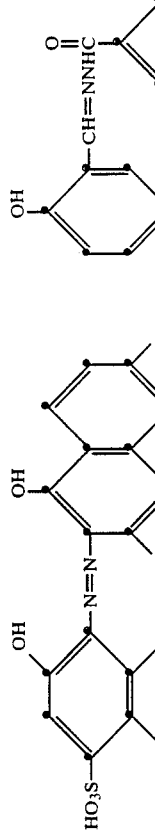 | 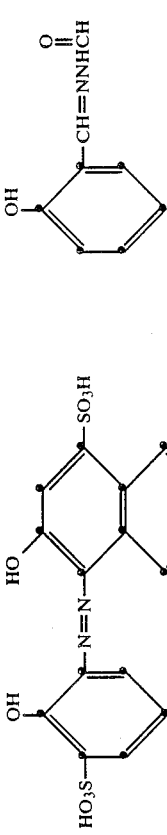 | dark blue |
| 15 | 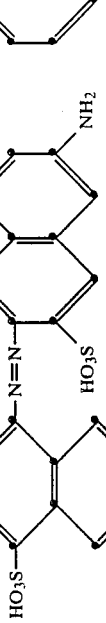 | 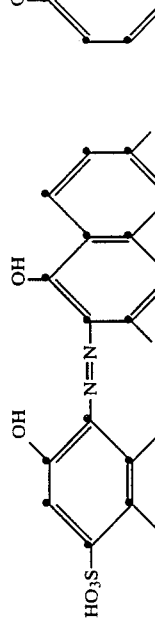 | 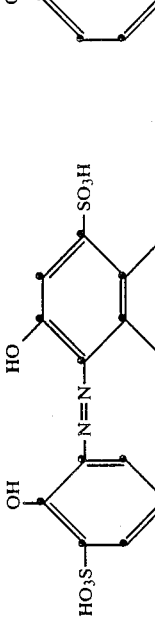 | dark blue |
| 16 | 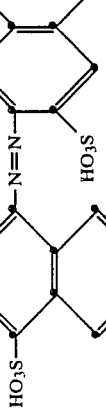 | 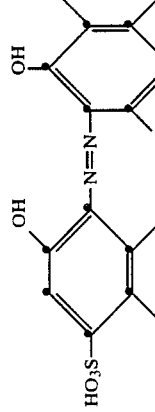 | 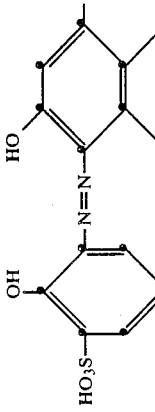 | bluish grey |
| 17 | 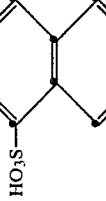 | 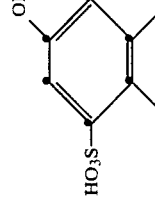 | 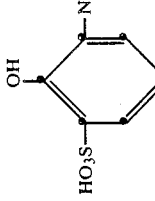 | grey |

-continued

| Example | I | II | III | IV |
|---|---|---|---|---|
| 18 | (HO₃S, OH, Cl-phenyl)−N=N−(OH, HO₃S-naphthyl)−NH₂ | (OH-phenyl)−CH=NNHCHO | BrCH₂CHBrCCl=O | grey |
| 19 | (HO₃S, OH, Cl-phenyl)−N=N−(OH, HO₃S-naphthyl)−NH₂ | (OH-phenyl)−CH=NNHCCH₃=O | BrCH₂CHBrCCl=O | grey |
| 20 | (HO₃S, OH, Cl-phenyl)−N=N−(OH, HO₃S-naphthyl)−NH₂ | (OH-phenyl)−CH=NNHCCH₃=O | ClCH₂CH₂CCl=O | grey |
| 21 | (O₂N, OH-phenyl)−N=N−(OH, HO₃S-naphthyl)−NH₂, SO₃H | (OH-phenyl)−CH=NNHCHO | BrCH₂CHBrCCl=O | bluish grey |
| 22 | (O₂N, OH-phenyl)−N=N−(OH, HO₃S-naphthyl)−NH₂, SO₃H | (OH-phenyl)−CH=NNHCHO | BrCH₂CHBrCCl=O | navy blue |

| Example | I | II | III | IV |
|---|---|---|---|---|
| 23 | 2-hydroxy-4-chlorophenyl azo / 1-amino-2-hydroxy-naphthalene-4,6-disulfonic acid derivative (NH$_2$, OH, SO$_3$H, HO$_3$S) | 2-hydroxyphenyl -CH=NNHCCH$_3$ (C=O) | BrCH$_2$CHCCl (C=O), Br | navy blue |
| 24 | isomer with SO$_3$H at other position | 2-hydroxyphenyl -CH=NNHCCH$_3$ (C=O) | BrCH$_2$CHCCl (C=O), Br | navy blue |
| 25 | 2-hydroxy-4-chloro-5-sulfophenyl azo / 1-amino-2-hydroxynaphthalene-6-sulfonic acid derivative | 2-hydroxyphenyl -CH=NNHCCH$_3$ (C=O) | BrCH$_2$CHCCl (C=O), Br | navy blue |
| 26 | 2-hydroxy-4,6-dichlorophenyl azo / 1-amino-2-hydroxynaphthalene-6-sulfonic acid derivative | 2-hydroxyphenyl -CH=NNHCCH$_3$ (C=O) | BrCH$_2$CHCCl (C=O), Br | navy blue |

-continued

| Example | I | II | III | IV |
|---|---|---|---|---|
| 27 | (dichloro-hydroxyphenyl)-N=N-(aminohydroxynaphthalene disulfonic acid) | salicylaldehyde formylhydrazone (OH, CH=NNHCH=O) | BrCH₂CHCl–C(=O)–CHClBr | navy blue |
| 28 | (hydroxy-nitro-sulfophenyl)-N=N-(hydroxy-sulfonaphthalene-amino) | salicylaldehyde formylhydrazone | BrCH₂CHCl–C(=O)–CHClBr | grey |
| 29 | (chloro-hydroxyphenyl)-N=N-(hydroxy-sulfo-aminonaphthalene) | salicylaldehyde formylhydrazone | BrCH₂CHCl–C(=O)–CHClBr | navy blue |
| 30 | (sulfo-hydroxy-nitrophenyl)-N=N-C(CH₃)=C(OH)–N=N–(aminophenyl) pyrazolone type | salicylaldehyde formylhydrazone | BrCH₂CHCl–C(=O)–CHClBr | orange |

4,678,851

-continued

| Example | I | II | III | IV |
|---------|---|----|-----|-----|
| 31 | (pyrazolone coupled with 3-amino-6-hydroxy-4-sulfo-phenyl and phenyl) | 2-hydroxy-phenyl-CH=NNHCHO | BrCH₂CHClC(O)Br | orange brown |
| 32 | (pyrazolone with 2,5-dimethyl-phenyl coupler and 3-amino-4-hydroxy-6-sulfo-phenyl) | 2-hydroxy-phenyl-CH=NNHC(O)CH₃ | BrCH₂CHClC(O)Br | violet brown |
| 33 | (pyrazolone coupled with 1-hydroxy-2-naphthyl and 3-amino-4-hydroxy-6-sulfo-phenyl) | 2-hydroxy-phenyl-CH=NNHC(O)CH₃ | BrCH₂CHClC(O)Br | claret |
| 34 | (naphthyl-azo-pyrazolone with phenyl and 7-amino-1-hydroxy-3-sulfo-naphthyl) | 2-hydroxy-5-sulfo-phenyl-CH=NNHCHO | BrCH₂CHClC(O)Br | claret |

-continued

| Example | I | II | III | IV |
|---|---|---|---|---|
| 35 | azo dye with HO₃S, OH, HO, N=N, HO₃S, NH₂, O₂N substituents on naphthalene-phenyl system | 2-hydroxybenzaldehyde CH=NNHCH=O | dichlorotriazinyl with NH-phenyl | grey |
| 36 | azo dye with HO₃S, OH, HO, N=N, HO₃S, NH₂, O₂N substituents on naphthalene-phenyl system | 2-hydroxybenzaldehyde CH=NNHCH=O | dichlorotriazinyl with O-CH(CH₃)₂ | grey |
| 37 | azo dye with OH, NH₂, N=N, HO₃S, SO₃H, Cl substituents | 2-hydroxybenzaldehyde CH=N-N(H)-C(=O)H | Cl-C(=O)-CH(Br)-CH₂-Br | navy blue |
| 38 | azo dye with HO₃S, OH, Cl, N=N, HO₃S, OH, NH₂ substituents | 2-hydroxybenzaldehyde CH=N-N(H)-C(=O)H | Cl-C(=O)-CH(Br)-CH₂-Br | navy blue |

-continued

| Example | I | II | III | IV |
|---------|---|----|-----|-----|
| 39 | [aminohydroxynaphthalene sulfonic acid azo chlorohydroxyphenyl] | 2-hydroxybenzaldehyde N-formyl hydrazone | Cl-CO-CHBr-CH₂-Br | bluish grey |
| 40 | [aminohydroxynaphthalene disulfonic acid azo dichlorohydroxyphenyl] | 2-hydroxybenzaldehyde N-formyl hydrazone | Cl-CO-CHBr-CH₂-Br | reddish grey |
| 41 | [aminohydroxynaphthalene sulfonic acid azo dichlorohydroxyphenyl] | 2-hydroxybenzaldehyde N-acetyl hydrazone | Cl-CO-CHBr-CH₂-Br | navy blue |
| 42 | [aminohydroxynaphthalene sulfonic acid azo dichlorohydroxyphenyl] | 2-hydroxybenzaldehyde N-benzoyl hydrazone | Cl-CO-CHBr-CH₂-Br | navy blue |

-continued

| Example | I | II | III | IV |
|---------|---|----|-----|-----|
| 43 | (OH, HO₃S)-phenyl–N=N–(OH, SO₃H)-naphthyl–N=N–(OH, NO₂)-phenyl–NH₂ | (OH)-phenyl–CH=N–NH–C(=O)–H | Br–CH₂–CH(Br)–C(=O)–Cl | grey |
| 44 | (SO₃H, OH)-naphthyl–N=N–(OH, SO₃H)-naphthyl–NH₂ | (OH)-phenyl–CH=N–NH–C(=O)–H | Br–CH₂–CH(Br)–C(=O)–Cl | bluish grey |
| 45 | (OH, O₂N, Cl)-phenyl–N=N–(NH₂, SO₃H, SO₃H)-naphthyl | (OH)-phenyl–CH=N–NH–C(=O)–H | Br–CH₂–CH(Br)–C(=O)–Cl | grey |
| 46 | (OH, NO₂, SO₃H)-phenyl–N=N–(OH, SO₃H, NH₂)-naphthyl | (OH)-phenyl–CH=N–NH–C(=O)–H | Br–CH₂–CH(Br)–C(=O)–Cl | bluish grey |

-continued

| Example | I | II | III | IV |
|---------|---|----|-----|-----|
| 47 | (OH, SO₃H, NO₂ phenyl)–N=N–(OH, SO₃H naphthyl)–NH₂ | 2-OH-phenyl–CH=N–NH–C(=O)–H | Br–CH₂–CH(Br)–C(=O)–Cl | bluish grey |
| 48 | (OH, Cl, Cl phenyl)–N=N–(OH, SO₃H naphthyl)–NH₂ | 2-OH-phenyl–CH=N–NH–C(=O)–H | Br–CH₂–CH(Br)–C(=O)–Cl | grey |
| 49 | (OH, HO₃S naphthyl)–N=N–(OH, SO₃H naphthyl)–NH₂ | 2-OH-phenyl–CH=N–NH–C(=O)–H | Br–CH₂–CH(Br)–C(=O)–Cl | grey |
| 50 | (OH, HO₃S, Cl phenyl)–N=N–(OH, SO₃H naphthyl)–NH₂ | 2-OH-phenyl–CH=N–NH–C(=O)–H | Br–CH₂–CH(Br)–C(=O)–Cl | bluish grey |

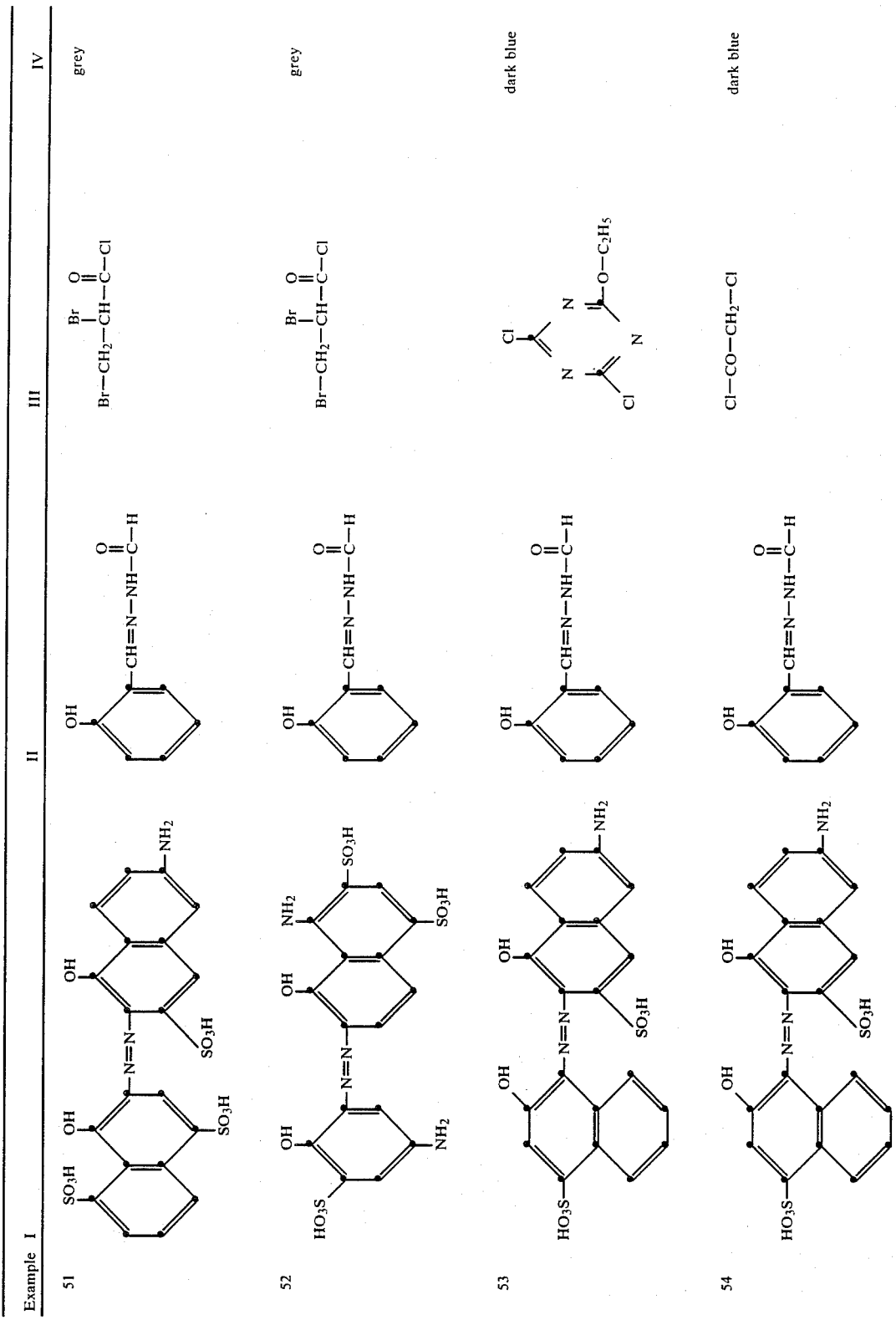

-continued

| Example | I | II | III | IV |
|---------|---|----|-----|-----|
| 55 | naphthol-azo-naphthol with HO₃S, OH, OH, N=N, SO₃H, NH₂ substituents | 2-hydroxybenzaldehyde CH=N-NH-C(=O)-H | difluoro-triazine with N(C₂H₅)(phenyl) | dark blue |
| 56 | naphthol-azo-naphthol with HO₃S, OH, OH, N=N, SO₃H, NH₂ substituents | 2-hydroxybenzaldehyde CH=N-NH-C(=O)-H | 2,4,5-trifluoro-3-chloropyrimidine | dark blue |
| 57 | naphthol-azo-naphthol with HO₃S, OH, OH, N=N, SO₃H, NH₂, NO₂ substituents | 2-hydroxybenzaldehyde CH=N-NH-C(=O)-H | Cl—CO—CH₂—CH₂—Cl | grey |
| 58 | naphthol-azo-naphthol with HO₃S, OH, OH, N=N, SO₃H, NH₂, NO₂ substituents | 2-hydroxybenzaldehyde CH=N-NH-C(=O)-H | difluoro-triazine with O—CH₂CH₂—O—CH₂—CH₃ | grey |

-continued

| Example | I | II | III | IV |
|---|---|---|---|---|
| 59 | HO₃S-/OH-phenyl-N=N-naphthol(OH,SO₃H,NH₂) with NO₂ | 2-hydroxybenzaldehyde CH=N-NH-C(=O)-H | 2,4-dichloro-6-methoxy-triazine | grey |
| 60 | HO₃S-/OH-phenyl-N=N-naphthol(OH,SO₃H,NH₂) with NO₂ | 2-hydroxybenzaldehyde CH=N-NH-C(=O)-H | Cl-CO-CH₂-Cl | grey |
| 61 | HO₃S-/OH-phenyl-N=N-naphthol(OH,SO₃H,NH₂) with Cl | 2-hydroxybenzaldehyde CH=N-NH-C(=O)-H | 2-chloro-4-ethoxy-triazine | dark blue |
| 62 | HO₃S-/OH-phenyl-N=N-naphthol(OH,SO₃H,NH₂) with Cl | 2-hydroxybenzaldehyde CH=N-NH-C(=O)-H | trifluorochloropyrimidine | dark blue |

-continued

| Example | I | II | III | IV |
|---------|---|----|-----|-----|
| 63 | (naphthalene with SO₃H, NH₂, OH, N=N to phenyl with OH, Cl, HO₃S) | 2-hydroxyphenyl-CH=N-NH-CHO | Cl—CO—CH₂—Cl | dark blue |
| 64 | (naphthalene with SO₃H, NH₂, OH, N=N to phenyl with OH, Cl, HO₃S) | 2-hydroxyphenyl-CH=N-NH-C(=O)-phenyl | dichloro-methoxy-triazine | dark blue |
| 65 | (naphthalene with SO₃H, NH₂, OH, N=N to phenyl with OH, Cl, HO₃S) | 2-hydroxyphenyl-CH=N-NH-C(=O)-phenyl | difluoro-methoxy-triazine | dark blue |
| 66 | (naphthalene with SO₃H, NH₂, OH, N=N to phenyl with OH, Cl, HO₃S) | 2-hydroxyphenyl-CH=N-NH-C(=O)-phenyl | Cl—CO—CH₂—Cl | dark blue |

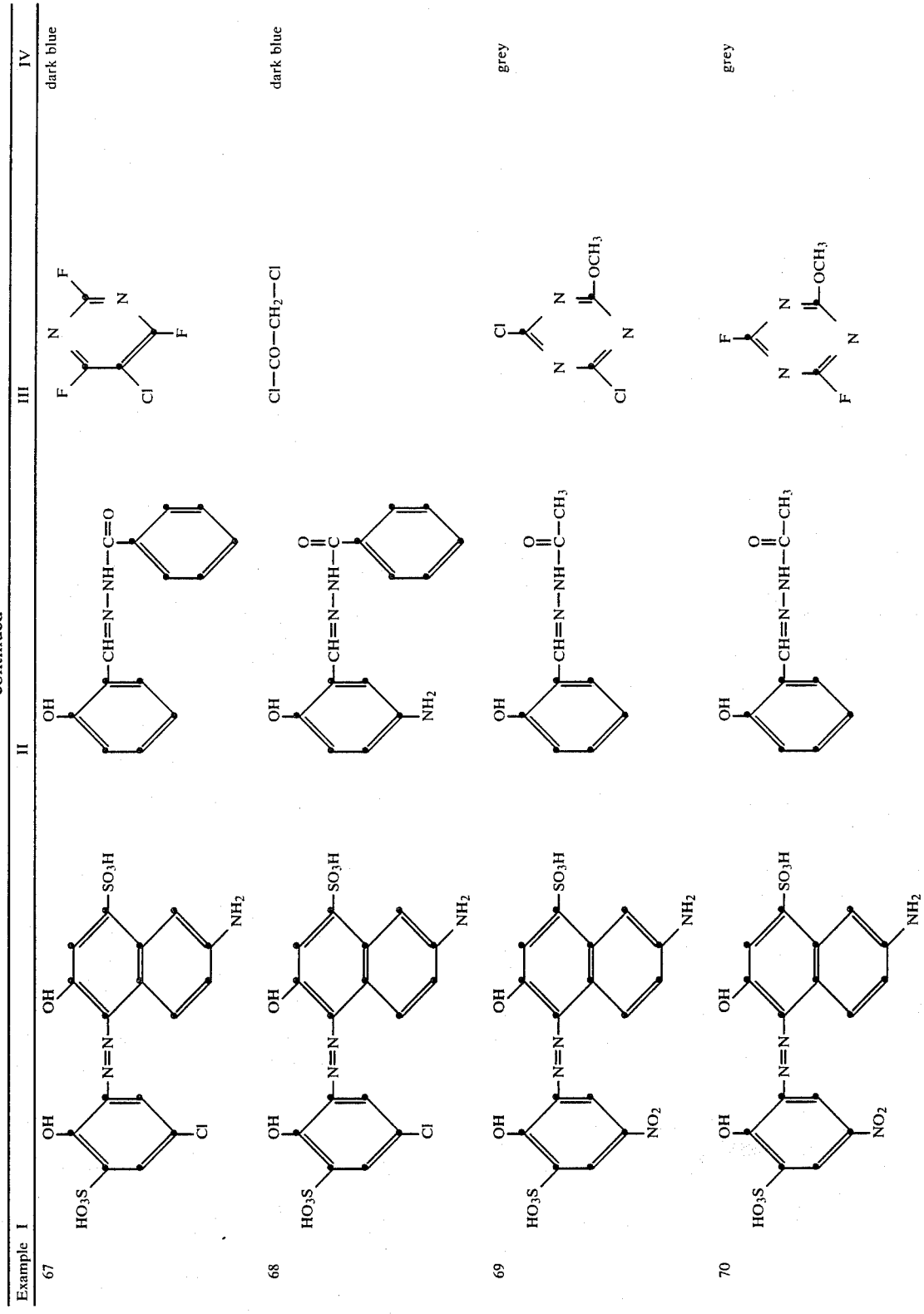

-continued

| Example | I | II | III | IV |
|---|---|---|---|---|
| 71 | HO₃S-, OH, N=N-, NO₂ / SO₃H, OH, NH₂ (naphthalene) | OH, CH=N-NH-C(=O)-CH₃ (phenyl) | Cl—CO—CH₂—Cl | grey |
| 72 | HO₃S-, OH, N=N-, NO₂ / SO₃H, OH, NH₂ (naphthalene) | OH, CH=N-NH-C(=O)-CH₃ (phenyl) | triazine with 2F, Cl | grey |

EXAMPLE 73

41.9 parts of the monoazo dye obtained from diazotised 1-hydroxy-2-amino-4-nibrobenzene-6-sulfonic acid and 1-phenyl-3-methyl-5-pyrazolone in the form of the 1:1 chromium complex containing 1 atom of chromium per molecule of azo dye are suspended in 600 parts of water at 60°–70° C. and dissolved by adding 5N sodium hydroxide solution until the pH is in the range from 9.0–9.5 While holding the temperature at 60°–70° C., a solution of 36.0 parts of crystalline sodium sulfide ($Na_2S \times 9H_2O$) in 100 parts of water is added dropwise. The reduction of the nitro group, which is accompanied by a change in colour from yellowish orange to orange red, is complete after stirring for 2 to 3 hours at the same temperature. The resultant amino group containing 1:1 chromium complex is precipitated by neutralising the reaction solution and adding sodium chloride, isolated by filtration and washed with a dilute solution of sodium chloride. The filter cake is suspended in 600 parts of water of 60°–65° C. and dissolved by adding 2N sodium hydroxide solution at pH 8.5–9.0. After addition of 17.9 parts of the acylhydrazone compound obtained according to Example 1 from salicylaldehyde and monoacetylhydrazine, the reaction mixture is stirred at 60°–70° C. and in the pH range from 8.0–9.0 until the reaction of the 1:1 chromium complex with the ligand is complete. The orange red reaction solution is subsequently cooled to 10°–15° C. and then a solution of 30 parts of 1,2-dibromopropionyl chloride in 30 parts of acetone is added over 1 hour while simultaneously keeping a pH range of 6.06–6.5 by the dropwise addition of 2N sodium hydroxide solution. After stirring for a further 2 hours at room temperature, the metal complex of the following structure

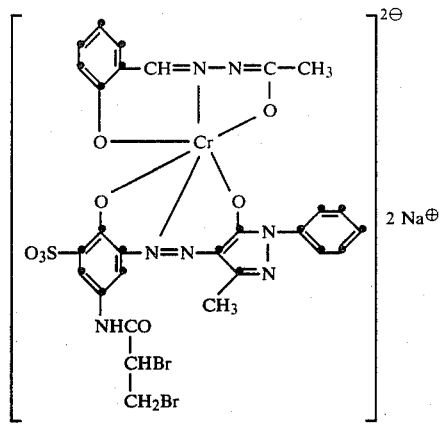

is precipitated from the reaction solution with sodium chloride isolated by filtration and dried in vacuo at 70° C. The novel water-soluble dye gives full, wetfast and lightfast reddish brown shades on woollen material by the indicated dyeing process.

EXAMPLE 74

38.9 parts of the monoazo dye obtained from diazotised 1-hydroxy-2-amino-4-nitrobenzene-6-sulfonic acid and 2-hydroxynaphthalene in the form of the 1:1 chromium complex containing 1 atom of chromium per molecule of azo dye are suspended, with stirring, in 600 parts of water at 65° C. and dissolved by adding 5N sodium hydroxide solution until the pH range is 9.0–9.5. While keeping a temperature of 65°–70° C., a solution of 36.0 parts of crystalline sodium sulfide ($Na_2S \times 9-H_2O$) in 100 parts of water is added dropwise over 1 hour. The reaction of the nitro group, which is accompanied by a change in colour from reddish violet to dark blue, is complete after stirring for 2 hours. The resultant amino group containing the 1:1 chromium complex is precipitated by neutralising the reaction solution and adding sodium chloride, insolated by filtration and washed with a dilute solution of sodium chloride. With stirring, the filter cake is dissolved in 600 parts of water of 70° C. at pH 7–7.5 by adding dilute sodium hydroxide solution. After addition of a neutral solution of 20.2 parts of 2-hydroxybenzaldehyde-5-sulfonic acid and 7.4 parts of monoacetylhydrazine in 100 parts of water, the reaction mixture is heated to 90°–95° C. and, while keeping a pH of 8.0, stirred until the addition reaction to give the homogeneous blue mixed complex is complete. The reaction solution is then cooled to 10°–15° C. and a solution of 30 parts of 1,2-dibromopropionyl chloride in 30 parts of acetone is added over 1 hour while keeping a pH range of 6.0–6.5 by the dropwise addition of 2N sodium hydroxide solution. After stirring for a further 2 hours, the dye of the following structure

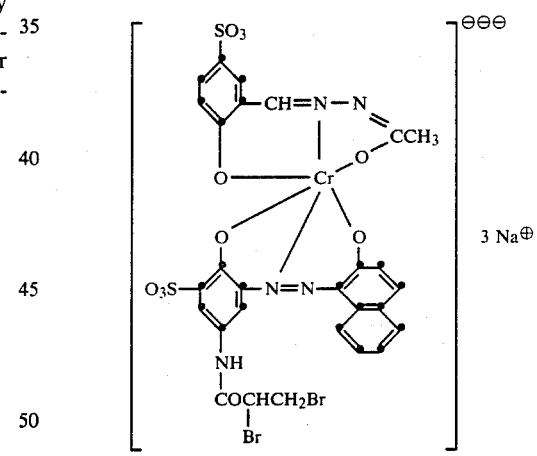

is precipitated from the reaction solution with sodium chloride, isolated by filtration and dried in vacuo at 60°–70° C.

The novel readily water soluble dye gives full bluish grey shades of very good fastness properties by the indicated dyeing procedures.

Further dyes with similar properties can be obtained in analogous manner by reacting the amino group containing monoazo compounds, in the form of the 1:1 chromium complexes listed in column I, with the compounds of column II and subsequently acylating the resultant chromium complex with 1,2-dibromopropionyl chloride. Column II indicates the shades obtained on wool with the novel dyes.

TABLE 2

| Example | I | II | III |
|---|---|---|---|
| 75 | [2-hydroxy-3-((2-hydroxy-5-tert-butylphenyl)azo)-5-(2,3-dibromopropanoylamino)benzenesulfonic acid] | 2-hydroxybenzaldehyde formyl hydrazone | brownish violet |
| 76 | " | 2-hydroxy-5-sulfobenzaldehyde benzoyl hydrazone | brownish violet |
| 77 | [1-hydroxy-2-((3-methyl-1-phenyl-5-hydroxypyrazol-4-yl)azo)-6-(2,3-dibromopropanoylamino)naphthalene-3-sulfonic acid] | " | claret |
| 78 | " | 2-hydroxybenzaldehyde semicarbazone | claret |
| 79 | [1-hydroxy-2-((2-hydroxynaphth-1-yl)azo)-6-(2,3-dibromopropanoylamino)naphthalene-3-sulfonic acid] | 2-hydroxy-5-sulfobenzaldehyde formyl hydrazone | grey |
| 80 | " | 2-hydroxy-5-sulfobenzaldehyde acetyl hydrazone | grey |

TABLE 2-continued

| Example | I | II | III |
|---|---|---|---|
| 81 | " | 2-hydroxy-5-sulfo-benzaldehyde semicarbazone | bluish grey |
| 82 | azo dye with OH, HO₃S, NH-COCHBr-CH₂Br substituents on phenyl-azo-pyrazolone-phenyl | HOOC-CH₂-C(=N-NHCO-C₆H₅)-CH₂-COOH | brownish red |
| 83 | azo dye with OH, SO₃H, NH-CO-CBr=CH₂ substituents | C₂H₅OOC-CH₂-C(CH₃)=N-NHCO-CH₃ | orange brown |
| 84 | azo dye on naphthalene with OH, HO₃S, NHCOCH₂Cl | 2-hydroxyphenyl-C(CH₃)=N-NHCO-CH₃ | claret |
| 85 | " | (CH₃)₂C(OH)-CH₂-C(CH₃)=N-NHCO-C₆H₅ | bluish red |
| 86 | azo dye with OH, HO₃S, OH, CH₃, CH₃, NHCOC(Br)=CH₂ | 2-hydroxy-5-sulfo-benzaldehyde thiosemicarbazone | brownish violet |

TABLE 2-continued

| Example | I | II | III |
|---|---|---|---|
| 87 | [structure: HO₃S-naphthol-N=N-naphthol with OH, HO, and NHCOCHCH₂Br/Br substituents] | [structure: OH-naphthol-CH=N-NHCH(=O) with OH and N] | bluish grey |
| 88 | " | [structure: OH-naphthol-CH=N-NHCH(=O)] | greenish grey |

EXAMPLE 89

With stirring, 41.9 parts of the monoazo dye obtained from diazotised 1-hydroxy-2-amino-4-nitrobenzene-6-sulfonic acid and 1-phenyl-3-methyl-5-pyrazolone, in the form of the 1:1 chromium complex containing 1 atom of chromium per molecule of azo dye, are dissolved in 500 parts of water at pH 7.

After addition of 19.4 parts of 2-hydroxy-5-aminobenzaldehyde semicarbazone, prepared in accordance with the method of M. Tanaka in Bull. Chem. Soc. Japan (1968), 41, 2807, the reaction mixture is heated to 90° C. while simultaneously keeping a pH range of 8.0–9.0 by the dropwise addition of dilute sodium hydroxide solution, whereupon a clear solution of the homogeneous adduct is obtained.

After cooling to 10°14 15° C. and addition of 15 parts of sodium bicarbonate, a solution of 30 parts of 1,2-dibromopropionyl chloride in 30 parts of acetone is added dropwise over 1 hour with efficient stirring, and the reaction mixture is stirred for a further 3 hours at room temperature.

The dye of the following structure is precipitated from the clear reaction solution by addition of sodium chloride and isolated by filtration. The filter cake is washed with a dilute solution of sodium chloride and dried in vacuo at 60° C. The novel dye is very readily soluble in water and dyes wool in full wet- and lightfast reddish orange shades by the described dyeing procedures.

Reaction of the above 1:1 chromium complex with 25.5 parts of 2-hydroxy-5-aminobenzaldehyde benzoylhydrazone or 21.0 parts of 2-hydroxy-5-aminobenzaldehyde thiosemicarbazone (prepared according to Tanaka, loc. cit.) instead of with the carbazone compound employed in this Example, under the same conditions and carrying out acylation as described above, affords an orange dye and a reddish orange dye respectively, with the same coloristic properties.

Further dyes with similar properties are obtained in analogous manner by reacting the 1:1 chromium complexes of the monoazo dyes listed in column I of Table 3 with the colourless compounds of column II and subsequently acylating the resultant chromium complex with 1,2-dibromopropionyl chloride. Column III indicates the shades obtained on wool with the dyes.

TABLE 3

| Example | I | II | III |
|---|---|---|---|
| 90 | | | red |
| 91 | | | bluish red |
| 92 | | | claret |
| 93 | | | greenish blue |
| 94 | | | blue |
| 95 | | | green |

TABLE 3-continued

| Example | I | II | III |
|---|---|---|---|
| 96 | [structure: HO₃S-naphthalene(OH)(O₂N)-N=N-naphthalene(HO)(SO₃H)] | [structure: HO-C₆H₃(NHCOCHBr CH₂Br)-CH=N-NHCNH₂ (C=S)] | dark green |

EXAMPLE 97

In accordance with the particulars of French patent specification 1 134 264, 43.3 parts of the monoazo dye obtained from diazotised 2-amino-4,6-dinitro-1-hydroxybenzene and 1-aminonaphthalene-4-sulfonic acid are converted into the corresponding 1:1 cobalt complex stabilised by nitrite ligands.

The resultant filter paste is suspended in 200 parts of water of 40°-45° C. After addition of 1.94 parts of 2-hydroxy-5-aminobenzaldehyde semicarbazone (prepared according to M. Tanaka, loc. cit., Example 89), the pH is adjusted to a range of 8.0-9.0 with 2N sodium hydroxide solution and then stirred at the above temperature until the addition of the hydrazone compound to the 1:1 cobalt complex is complete, with removal of the nitrite ligands. The resultant dark green solution is neutralised by the dropwise addition of dilute hydrochloric acid and cooled to 0°-5° C. Acrylation of the free amino group with 3.0 parts of 1,2-dibromopropionyl chloride is then carried out as described in the preceding Examples.

The resultant reactive cobalt complex of the following structure

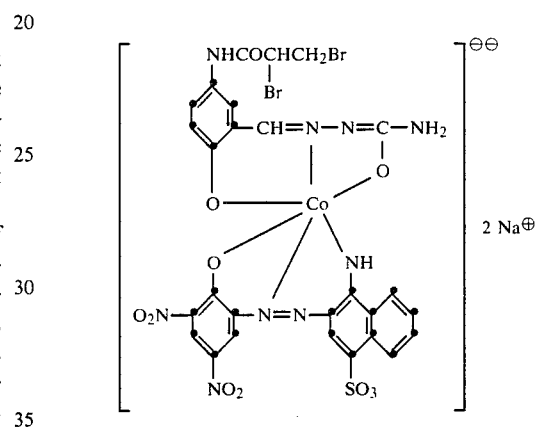

is salted out with sodium chloride and isolated by filtration. The filter cake is washed with a dilute solution of sodium chloride and vacuum dried at 60° C. The novel, readily water-soluble dye produces full, wet-and light-fast dark green shades on normal and chlorinated wool. Further dyes with similar properties are obtained in analogous manner by reacting the monoazo compounds listed in column I of Table 4, in the form of the 1:1 chromium complexes with nitrite ligands, with the compounds of column II and subsequently acylating the resultant cobalt complexes with 1,2-dibromopropionyl chloride. Column III indicates the shades obtained on wool with the dyes.

TABLE 4

| Example | I | II | III |
|---|---|---|---|
| 98 | [structure: O₂N-C₆H₃(NO₂)(OH)-N=N-naphthalene(SO₃H)(H₂N)] | [structure: HO-C₆H₃(NH-CO-CHBrCH₂Br)-CHNNHC(=O)-C₆H₅] | greenish grey |

TABLE 4-continued
| Example | I | II | III |
|---|---|---|---|
| 99 | " | 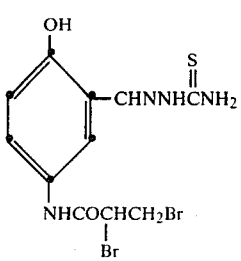 | dark green |
| 100 | 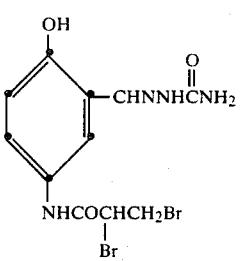 | 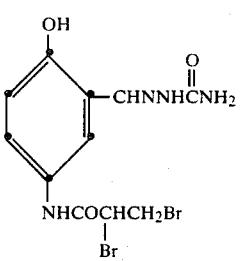 | dark green |
| 101 | 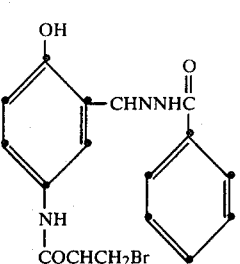 | 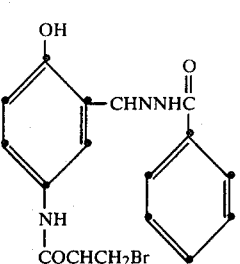 | green |
| 102 | " | 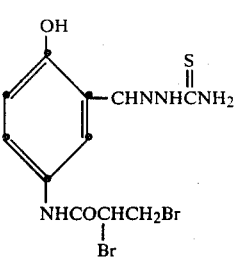 | green |
| 103 | 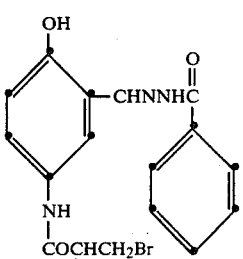 | 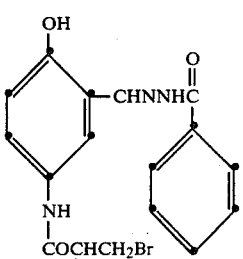 | olive green |

TABLE 4-continued

| Example | I | II | III |
|---|---|---|---|
| 104 | (structure: O₂N—C₆H₃(OH)(NO₂)—N=N—naphthyl(SO₃H)—NH—C₆H₄—) | OH—C₆H₃(NHCOCHBrCH₂Br)—CH=N—NH—C(O)—NH₂ | dark green |

DYEING EXAMPLE 1

A piece of chlorinated wool flannel is impregnated on a pad with the following dye composition and is pinched off to a liquor pick-up of 100%:

| | |
|---|---|
| 50 parts | of the dye of Example 9 |
| 300 parts | of urea |
| 320 parts | of 4% Solvitose OFA (thickener) |
| 10 parts | of a mixture of anionic fatty alcohol ether sulfate with nonionic wetting agents |
| 10 parts | of the levelling agent used in Dyeing Example 5 |
| 10 parts | of sodium metabisulfite |
| 10 parts | of 80% acetic acid |
| 290 parts | of water |
| 1000 parts | of padding liquor |

The impregnated fabric is wound into a roll and packed airtight and is stored in this state at room temperature for 48 hours. The material is rinsed with cold water and then treated in a fresh bath with sufficient 24% ammonia to give pH 8.5 and is held at 80° for 15 minutes. The fabric is rinsed in warm water and finally acidified with 80% acetic acid and dried. The wool fabric is dyed in a full black shade of excellent fastness properties.

DYEING EXAMPLE 2

2 parts of the dye obtained in Example 36 are dissolved in 100 parts of water with the addition of 0.5 part of m-nitrobenzenesulfonate. A cotton fabric is impregnated with this solution to a pick-up of 75% and the fabric is then dried.

The fabric is then impregnated with a warm solution of 20° C. which contains, per liter, 5 g of sodium hydroxide and 300 g of sodium chloride. The fabric is pinched off to 75% liquor pick-up and the dyeing is steamed at 100° to 101° C. for 30 seconds, rinsed, soaped in a 0.3% boiling solution of a nonionic detergent for a quarter of an hour, then rinsed and dried. The cotton fabric is dyed in a grey shade of excellent fastness properties.

DYEING EXAMPLE 3

2 parts of the dye obtained in Example 35 are dissolved in 100 parts of water. The solution is added to 1900 parts of cold water, 60 parts of sodium chloride are added, and 100 parts of a cotton fabric are put into this dyebath. The temperature is raised to 40° C., and after 30 minutes 40 parts of calcined sodium carbonate and a further 60 parts of sodium chloride are added. The temperature is maintained at 40° C. for 30 minutes, and the dyeing is rinsed and then soaped in a 0.3% boiling solution of a nonionic detergent for 15 minutes, rinsed and dried.

A greenish grey shade of good fastness properties is obtained on the cotton fabric.

DYEING EXAMPLE 4

A piece of chlorinated wool flannel is impregnated on a pad with the following dye composition and is pinched off to a liquor pick-up of 100%:

| | |
|---|---|
| 50 parts | of the dye of Example 21 |
| 300 parts | of 40% Solvitose OFA (thickener) |
| 20 parts | of a mixture of anionic fatty alcohol ether sulfate with nonionic wetting agents |
| 10 parts | of the levelling agent used in Dyeing Example 5 |
| 20 parts | of 80% acetic acid |
| 600 parts | of water |
| 1000 parts | of padding liquor |

The impregnated fabric is then put into a steamer and treated with saturated steam for 20 to 40 minutes. The material is rinsed with cold water and then treated in a fresh bath with sufficient 24% ammonia solution to give a pH of 8.5 and is held at 80° C. for 15 minutes. After rinsing in warm water the fabric is finally acidified with 80% acetic acid and dried. A full black shade of excellent fastness properties is obtained on the wool fabric.

DYEING EXAMPLE 5

4 parts of 80% acetic acid, 2 parts of the ammonium salt of the acid sulfuric acid ester of the adduct of a fatty amine (comprising 30% hexadecylamine, 25% octadecylamine and 45% octadecenylamine and 7 moles of ethylene oxide) and 4 parts of ammonium sulfate are dissolved, in succession, in 1000 parts of water of 50° C.

3 parts of the dye obtained in Example 5 are dissolved in 100 parts of hot water, and this solution is added to the above dyebath. A circulation dyeing apparatus is charged with 100 parts of prewetted wool tops in package form, the temperature of the bath is raised from 50° to 97°-99° C. in the course of 30 minutes, and dyeing is then carried out for 90 minutes at the boil. Almost all the dye exhausts onto the substrate. After the bath has cooled to 80° C. it is brought from about pH 4.5 to a constant pH of 8.5 by adding ammonia solution, and the dyed material is after-treated at this temperature. Thorough rinsing with hot and cold water, acidifying with 1 part of 80% formic acid, centrifuging and drying produce a dark blue dyeing of very good wetfastness and excellent light-fastness.

DYEING EXAMPLE 6

6 parts of 80% acetic acid, 3 parts of the ammonium salt of the acid sulfuric acid ester of the adduct of a fatty amine (comprising 30% hexadecylamine, 25% octadecylamine and 45% octadecenylamine and 7 moles of ethylene oxide) and 6 parts of ammonium sulfate are dissolved, in succession, in 1000 parts of water of 50° C.

3 parts of the dye obtained in Example 26 are dissolved in 100 parts of hot water, and this solution is added to the above dyebath. A circulation dyeing apparatus is charged with 100 parts of prewetted loose wool, the temperature of the bath is raised from 50° to 97°-99° C. in the course of 30 minutes, and dyeing is then carried out for 90 minutes at the boil. Almost all the dye exhausts onto the substrate. After the bath has cooled to 80° C. it is brought from about pH 4.5 to a constant pH of 8.5 by adding ammonia solution, and the dyed material is aftertreated at said temperature. Thorough rinsing with hot and cold water, acidifying with 1 part of 80% formic acid, centrifuging and drying produce a dark blue level dyeing of good wetfastness and rubfastness and excellent light fastness.

DYEING EXAMPLE 7

100 parts of prewetted textured tricot made from polyamide 6,6 fibres are put at 50° C. into a dyebath which contains 3 parts of ammonium sulfate and 2 parts of the dye of Example 90 in 3000 parts of deionised water. While constantly agitating the goods, the temperature is raised to 95°-98° C. over 40 minutes and kept at this temperature for a further hour. The dyebath is then cooled and the goods are rinsed with cold water and dried. A full, wet- and lightfast red dyeing is obtained.

Polyamide tricot fabric dyed in a wet- and lightfast green shade is obtained by carrying out an analogous dyeing procedure with 2.5 parts of the dye of Example 95 under the same conditions.

What is claimed is:

1. A chromium or cobalt complex of the formula

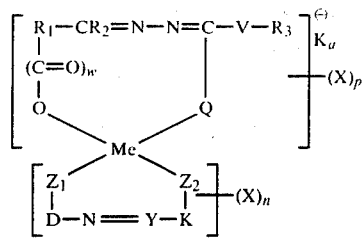

wherein
D is a benzene, naphthalene or heterocyclic radical of a diazo component;
Y is nitrogen or —CH;
K is a radical of a coupling component if Y is nitrogen, or an o-hydroxyaldehyde radical if Y is —CH;
Ka is a cation;
Me is chromium or cobalt;
$Z_1$ is —O— or —COO— ortho to N=Y
$Z_2$ is —O— or —NR vicinal to N=Y, wherein R is hydrogen, $C_1$-$C_4$ alkyl or phenyl;
X is a fiber reactive radical which is bound directly to or through an amino group to the complex and which contains removable substituents that react with hydroxyl groups in cellulosic or with the $NH_2$ groups in polyamide fiber materials;
$R_1$ is a direct bond or a $C_1$-$C_8$-alkyl, $C_1$-$C_8$-alkenyl, or aryl radical or heterocyclic radical containing 1 to 3 sulfur, oxygen or nitrogen atoms;
$R_2$ is hydrogen, $C_1$-$C_8$-alkyl or aryl;
$R_3$ is hydrogen, a $C_1$-$C_8$-alkyl, aryl or amino radical, or a heterocyclic radical containing 1 to 3 sulfur, oxygen or nitrogen atoms;
V is a direct bond or oxygen;
Q is oxygen or sulfur;
w is 0 or 1;
n is 0, 1, 2, 3 or 4, and
p is 0, 1, 2
with the proviso that the sum of n+p is at least 1.

2. A complex according to claim 1, wherein X is an aliphatic or heterocyclic radical.

3. A complex according to claim 1 which contains at least one water-solubilizing group.

4. A complex according to claim 3 wherein said solubilizing group is a sulfonic acid group.

5. A chromium or cobalt complex according to claim 1 of the formula

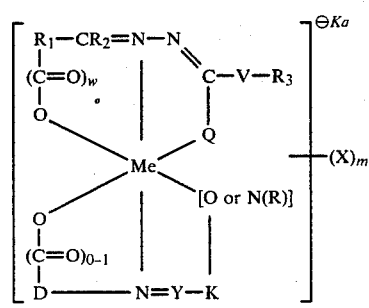

wherein $R_1$ is the direct bond, an unsubstituted or carboxy-substituted $C_1$-$C_8$alkyl radical, a $C_1$-$C_8$alkenyl radical, or a phenyl or naphthyl radical, each unsubstituted or substituted by $C_1$-$C_4$alkyl, halogen, nitro, $C_2$–$C_5$alkanoylamino, sulfo, carboxy or arylazo, or is a heterocyclic radical, $R_2$ is hydrogen, an unsubstituted or carboxy-substituted $C_1$–$C_8$alkyl or is a phenyl or naphthyl radical, each unsubstituted or substituted by $C_1$–$C_4$alkyl, halogen, nitro, $C_2$–$C_5$alkanoylamino, sulfo or carboxy, $R_3$ is hydrogen, $C_1$–$C_8$alkyl, $C_1$–$C_4$phenylalkyl, $C_1$–$C_4$naphthylalkyl, phenyl or naphthyl, each unsubstituted or substituted by $C_1$–$C_4$alkyl, $C_1$–$C_4$alkoxy, halogen, $C_2$–$C_5$alkanoylamino, nitro, hydroxy, cyano, sulfo or phenylazo, or is a radical of the formula

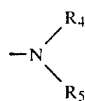

wherein $R_4$ and $R_5$ are each independently of the other hydrogen, $C_1$–$C_8$alkyl or phenyl; K, if Y is a nitrogen atom, is the radical of a coupling component of benzene, naphthalene, 5-pyrazolone, 5-aminopyrazolone, quinoline, acetoacetarylide or benzoylacetarylide, which radical contains the —O— or —N(R)— radical vicinal to the azo group, and R is hydrogen, $C_1$–$C_4$alkyl or phenyl, or, if Y is the —CH— group, K is the radical of an o-hydroxybenzaldehyde or o-hydroxynaphthaldehyde, and m is 1, 2, 3 or 4.

6. A chromium or cobalt complex according to claim 5 wherein m is 1 or 2.

7. A chromium or cobalt complex according to claim 5, wherein X is an acryloyl, monohaloacryloyl, dihaloacryloyl, trihaloacryloyl, monohalomethacryloyl, dihalomethacryloyl, trihalomethacryloyl, monohaloproprionyl, dihalopropionyl, phenylsulfonylpropionyl, methylsulfonylpropionyl, vinylsulfonyl, β-chloroethylsulfonyl, β-sulfatoethylsulfonyl, or β-chloroethylsulfonylbutyryl radical, or a monohalopyrimidyl, dihalopyrimidyl, trihalopyrimidyl, monohalotriazinyl or dihalotriazinyl radical where X is attached to D, K or $R_1$ through a bridge member of the formula

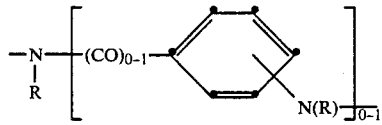

or —$CH_2$—N(R)—, and R is defined in claim 5.

8. A chromium or cobalt complex according to claim 5 of the formula

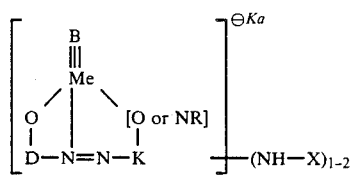

wherein B is the radical of the formula

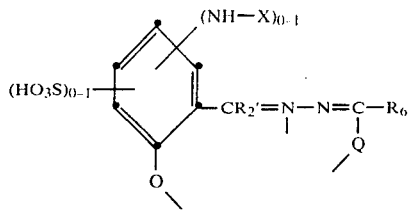

wherein $R_2'$ is hydrogen or methyl, $R_6$ is hydrogen, methyl, phenyl or $NH_2$, and Q is an oxygen or sulfur atom; or is the radical of the formula

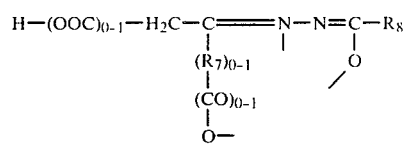

wherein $R_7$ is $C_1$–$C_4$alkyl and $R_8$ is methyl or phenyl; or is the radical of the formula

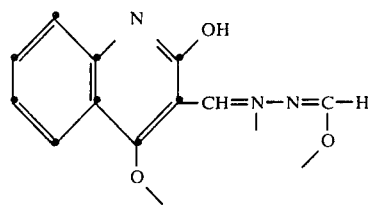

or the radical of the formula

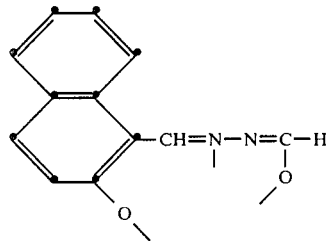

and D is a benzene nucleus which contains the oxygen atom ortho to the azo bridge and which is unstubstituted or substituted by sulfo, chlorine, nitro, methoxy and the —NH—X radical, or is a naphthalene nucleus which contains the oxygen atom in the 1- or 2-position and the azo group in the 2- or 1-position and which is unsubstituted or substituted by sulfo, nitro and the —NH—X radical; K is a naphthalene nucleus which is unsubstituted or substituted by 1 or 2 sulfo groups in addition to the NH—X radical and contains the oxygen atom or —N(R), where R is hydrogen or phenyl, ortho to the azo group, or is a 1-phenyl-3-methyl-5-pyrazolone radical which is unsubstituted or substituted in the phenyl ring by the —NH—X radical or sulfo, or is a dimethylphenol or tert-butylphenol radical which is substituted by the oxygen atom ortho to the azo group, or is a 2-hydroxyquinolinyl radical which contains the azo group in the 3-position and the oxygen atom in the 4-position, and X is the alpha,β-dibromopropionyl, alpha-bromoacryloyl, chloroacetyl, β-chloropropionyl, 2-fluoro-4-(N-ethyl-N-phenylamino)1,3,5-triazin-6-yl, 2-fluoro-4-methoxy- or -4-β-ethoxyethoxy-1,3,5-triazin-6-yl, 2-chloro-4-phenylamino-1,3,5-triazin-6-yl, 2-chloro-4-methoxy- or -4-ethoxy- or -4-isopropoxy-1,3,5-triazin-6-yl or 2,4-difluoro-5-chloropyrimidin-6-yl radical, Me is a chromium or cobalt atom, and Ka is an alkali cation.

9. A chromium or cobalt complex according to claim 8 wherein Me is chromium.

10. A chromium or cobalt complex according to claim 8 wherein B is a radical of the formula

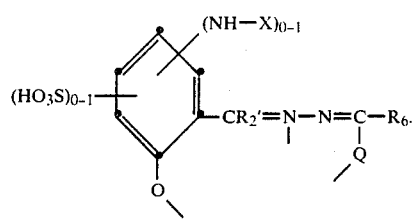

11. A chromium or cobalt complex according to claim 8, wherein X is the alpha,β-dibromopropionyl radical.

12. A chromium complex according to claim 8, wherein K is a naphthalene nucleus which is unsubstituted or substituted by 1 or 2 sulfo groups in addition to the —NH—X radical and contains the oxygen atom ortho to the azo group.

13. The chromium complex according to claim 12 of the formula

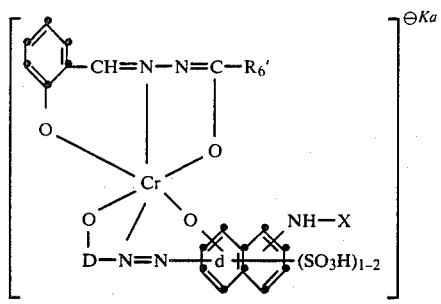

wherein $R_6'$ is hydrogen, methyl, phenyl or amino, D is a benzene nucleus which contains the oxygen atom ortho to the azo bridge and is unsubstituted or substituted by chlorine or nitro, or is a naphthalene nucleus which contains the oxygen atom in the 1- or 2-position and the azo group in the 2- or 1-position and which is unsubstituted or substituted by sulfo or nitro, and X is an alpha,β-dibromopropionyl or alpha-bromoacryloyl radical, and wherein the azo group is attached to the ring d ortho to the oxygen atom, and Ka is an alkali cation.

14. The chromium complex according to claim 13 of the formula

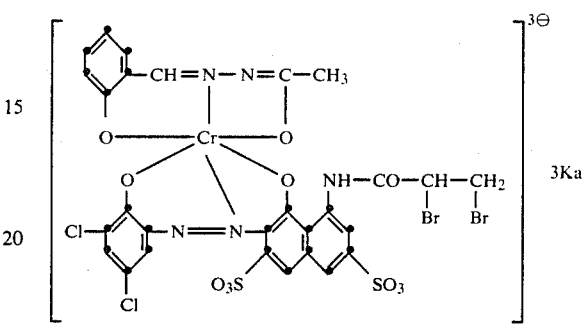

wherein Ka is an alkali cation.

15. A complex according to claim 5 wherein $R_1$ is phenyl or naphthyl, each unsubstituted or substituted by $C_1$–$C_4$alkyl, halogen, nitro, acetylamino, sulfo, phenylazo, sulfophenylazo or —NH—X, or is quinolinyl which is substituted by hydroxy, $R_2$ is hydrogen or $C_1$–$C_4$alkyl, w is 0, and $R_3$ is hydrogen, amino, $C_1$–$C_4$alkyl, or phenyl which is unsubstituted or substituted by $C_1$–$C_4$alkyl, halogen or nitro.

16. A complex according to claim 5 wherein $R_1$ is a direct bond, $R_2$ is hydrogen, $C_1$–$C_4$alkyl, carboxy-substituted $C_1$–$C_4$alkyl, or phenyl, w is 1, Q is an oxygen atom, and $R_3$ is hydrogen, amino, $C_1$–$C_4$alkyl, phenyl or phenyl which is substituted by $C_1$–$C_4$alkyl, halogen or nitro.

17. A complex according to claim 5 wherein $R_1$ is $C_1$–$C_4$alkyl, $R_2$ is hydrogen or unsubstituted or carboxy-substituted $C_1$–$C_4$alkyl, Q is an oxygen atom, and $R_3$ is hydrogen, amino, $C_1$–$C_4$alkyl, or phenyl which is unsubstituted or substituted by $C_1$–$C_4$alkyl, halogen or nitro.

18. A complex according to claim 5 wherein $R_1$ is $C_3$–$C_6$alkenyl, $R_2$ and $R_3$ are each independently of the other hydrogen, $C_1$–$C_4$alkyl, or phenyl which is unsubstituted or substituted by $C_1$–$C_4$alkyl, halogen or nitro, or $R_3$ is amino, and w is 0 and Q is an oxygen atom.

19. A chromium or cobalt complex according to claim 1 wherein Y is a nitrogen atom.

* * * * *